United States Patent [19]

Hester et al.

[11] Patent Number: 4,638,451
[45] Date of Patent: Jan. 20, 1987

[54] MICROPROCESSOR SYSTEM WITH PROGRAMMABLE INTERFACE

[75] Inventors: Richard K. Hester, Whitewright; Khen-Sang Tan, Plano, both of Tex.

[73] Assignee: Texas Instruments Incorporated, Dallas, Tex.

[21] Appl. No.: 491,140

[22] Filed: May 3, 1983

[51] Int. Cl.[4] .................. G06F 3/05; G06F 13/00
[52] U.S. Cl. ....................... 364/900; 364/513.5
[58] Field of Search ... 364/200 MS File, 900 MS File, 364/513.5; 340/347 M, 347 AD; 381/36, 51

[56] References Cited

U.S. PATENT DOCUMENTS

| | | | |
|---|---|---|---|
| 4,050,062 | 9/1977 | Crocker et al. | 364/900 |
| 4,112,425 | 9/1978 | Zobrist et al. | 364/900 |
| 4,193,123 | 3/1980 | Meinke | 364/900 |
| 4,202,040 | 5/1980 | Whitworth et al. | 364/900 |
| 4,287,558 | 9/1981 | Nishitani | 364/200 |
| 4,371,947 | 2/1983 | Fujisawa | 364/900 |
| 4,472,832 | 9/1984 | Atal et al. | 364/513.5 |

Primary Examiner—James D. Thomas
Assistant Examiner—William G. Niessen
Attorney, Agent, or Firm—John G. Graham

[57] ABSTRACT

A microprocessor system includes a CPU device with on-chip or off-chip memory, and data and control busses for accessing memory and/or peripherals. The peripheral circuitry includes one or more channels for input and/or output of data, wherein various characteristics of the treatment of data in the channel are controlled by the program being executed in the CPU. In one embodiment analog input and output channels are included, and the A-to-D or D-to-A conversion rates are selected by executing a data output instruction by the CPU. The cut-off points of the filters are likewise selected. The A-to-D converter loads a first-in first-out memory which is read by the CPU in burst mode when filled. Likewise, the CPU loads digital data to a first-in first-out memory in the output channel, and then the D-to-A converts at its selected rate.

7 Claims, 8 Drawing Figures

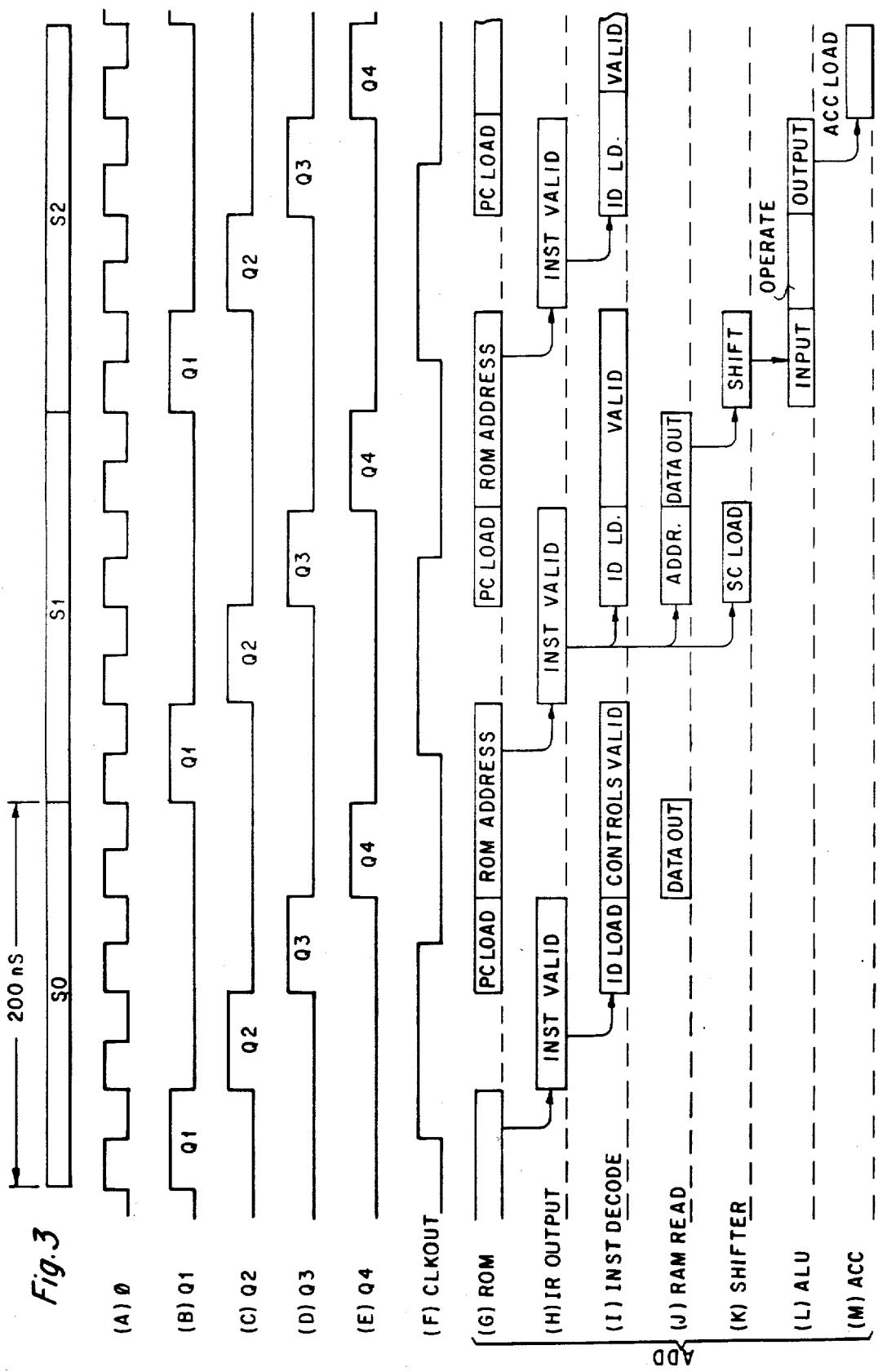

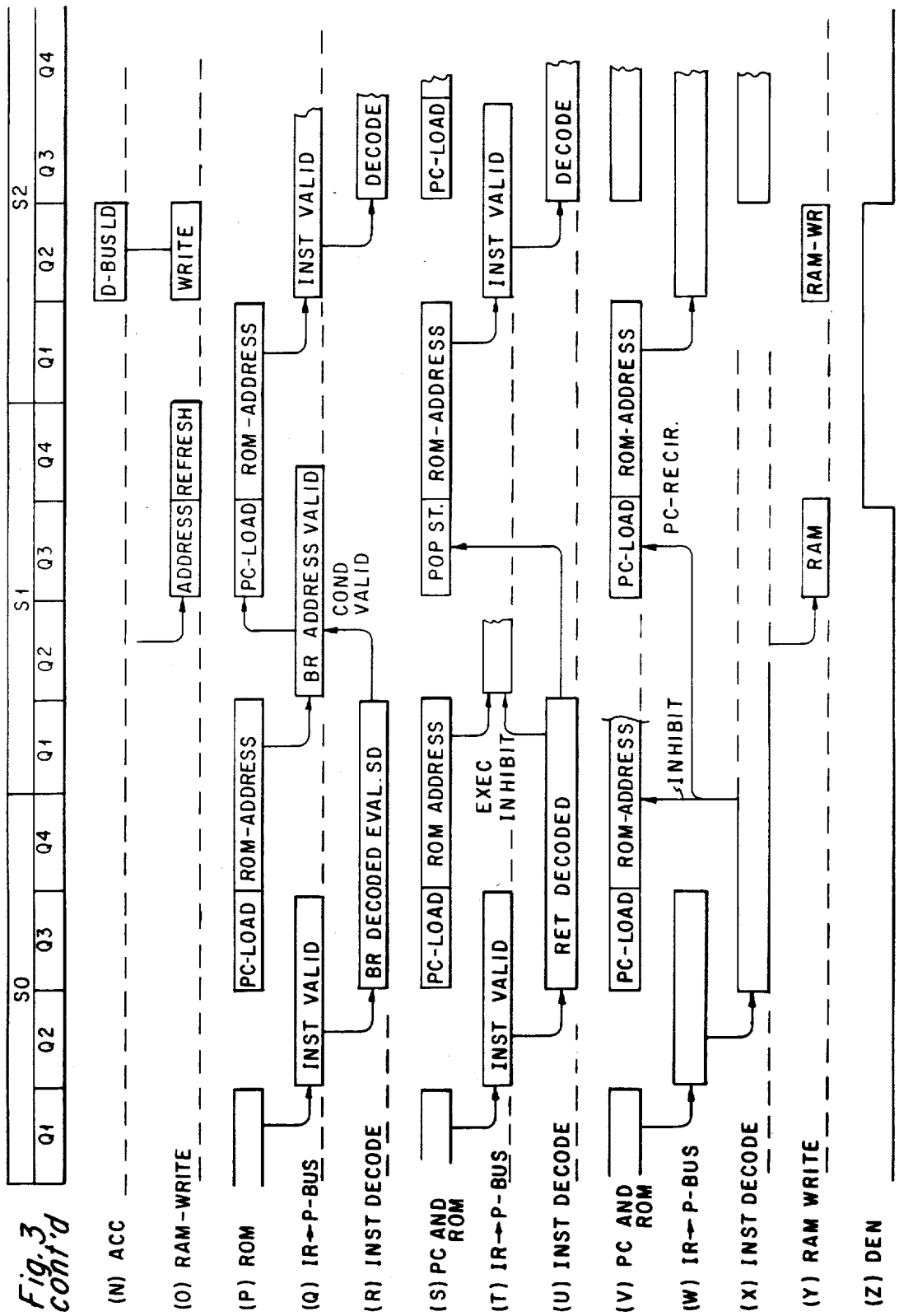

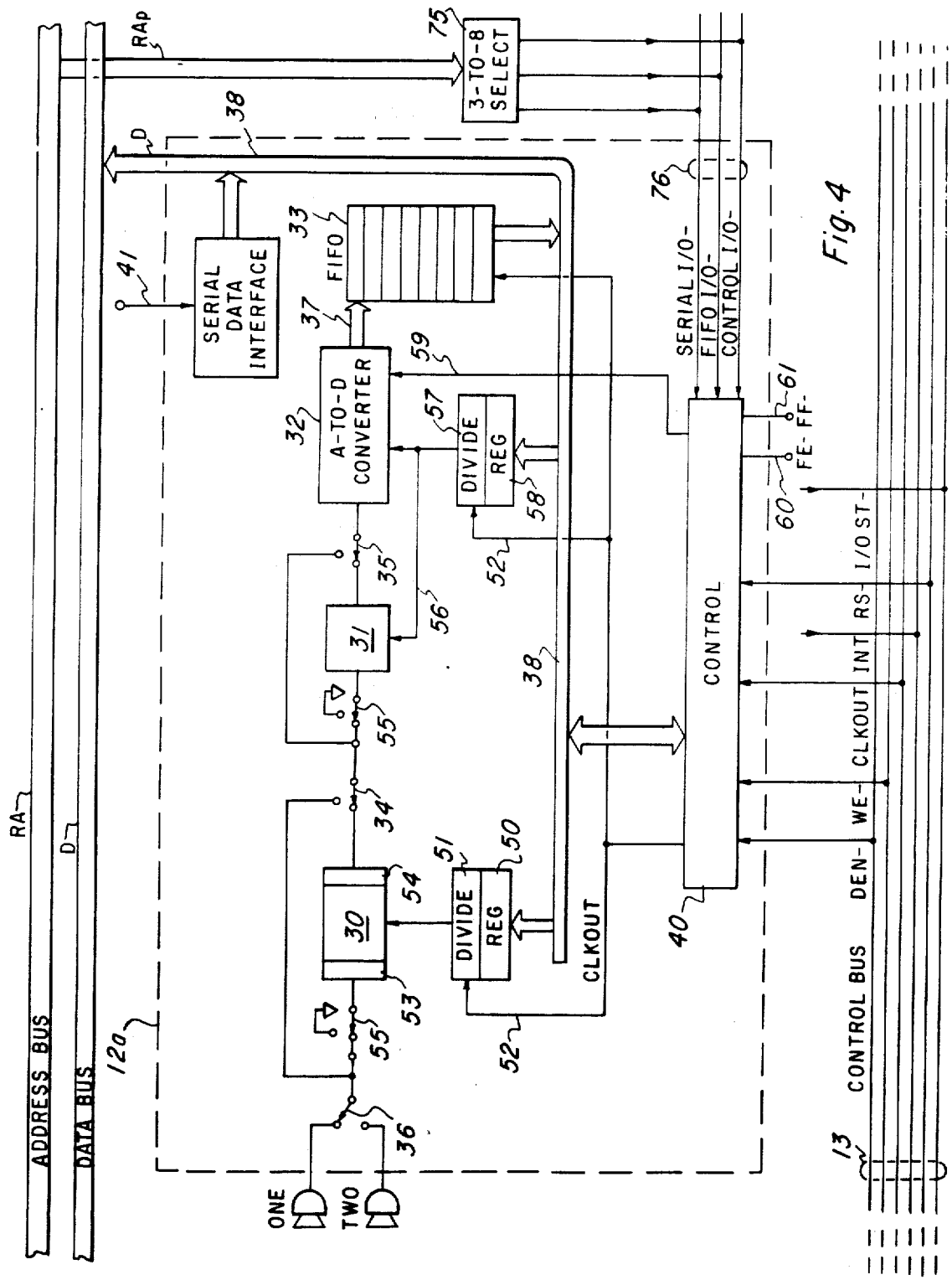

MICROPROCESSOR SYSTEM WITH PROGRAMMABLE INTERFACE

BACKGROUND OF THE INVENTION

This invention relates to microprocessor systems, and more particularly to interface circuits for microprocessors.

In order to reduce the cost, size, power dissipation and complexity of a microprocessor system, it is usually preferable to include all of the circuitry of the system in a minimum number of integrated circuits. Indeed, for many small systems such as calculators, electronic games, and applicance controllers, all of the system can be in a single chip. For more complex systems, especially those involving analog signals such as speech, the cost of including the interface circuitry on the chip with the CPU becomes prohibitive. That is, very large high-performance processors can be built as single-chip devices, and most or all of the memory needed for the system can be included on this same chip; this is still a relatively low-cost device because the same device can be used for many different systems, allowing large scale production and minimum design effort. The interface circuitry for connecting this CPU to the remainder of the system may add disproportionately to the design cost and system cost, however, because the interface varies from system to system, requiring unique circuit design, chip design, packaging, board layout, and the like, and also resulting in more limited production runs, so economy of scale is not achieved.

It is the principal object of this invention to provide improved interface circuitry for microprocessor systems, more particularly to provide interface circuitry that is useful in a wide variety of systems and for different purposes without redesign. Another object is to provide peripheral I/O circuitry or interface circuitry for handling analog signals such as speech, particularly such circuitry which is programmable by the processor so that a variety of functions is available.

SUMMARY OF THE INVENTION

In accordance with one embodiment of the invention, a microprocessor or microcomputer device has an analog input channel and an analog output channel coupled to the address/data bus and control bus of the processor for interfacing with an environment including analog signals such as speech. The analog input channel has a filter of selectable frequency response coupling an analog signal, such as that received from a microphone, to an A-to-D converter, with the digital output of the converter connected to a FIFO memory. The sampling rate of the A-to-D is controllable from the processor. The contents FIFO memory can be loaded into the processor memory when full. In this manner, the processor can attend to other tasks for longer periods without interruption. The analog output channel contains the same type of elements in reverse order. A FIFO memory receives digital data from the processor in bursts, then loads a D-to-A converter at a rate controlled by the processor. The analog output of the converter goes through a filter of selectable frequency response, controlled by the processor, and to an analog signal output.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 4 is an electrical diagram in block form of the analog input channel 12a of the system of FIG. 1.

DETAILED DESCRIPTION OF SPECIFIC EMBODIMENT

MICROPROCESSOR SYSTEM

Figure 1:
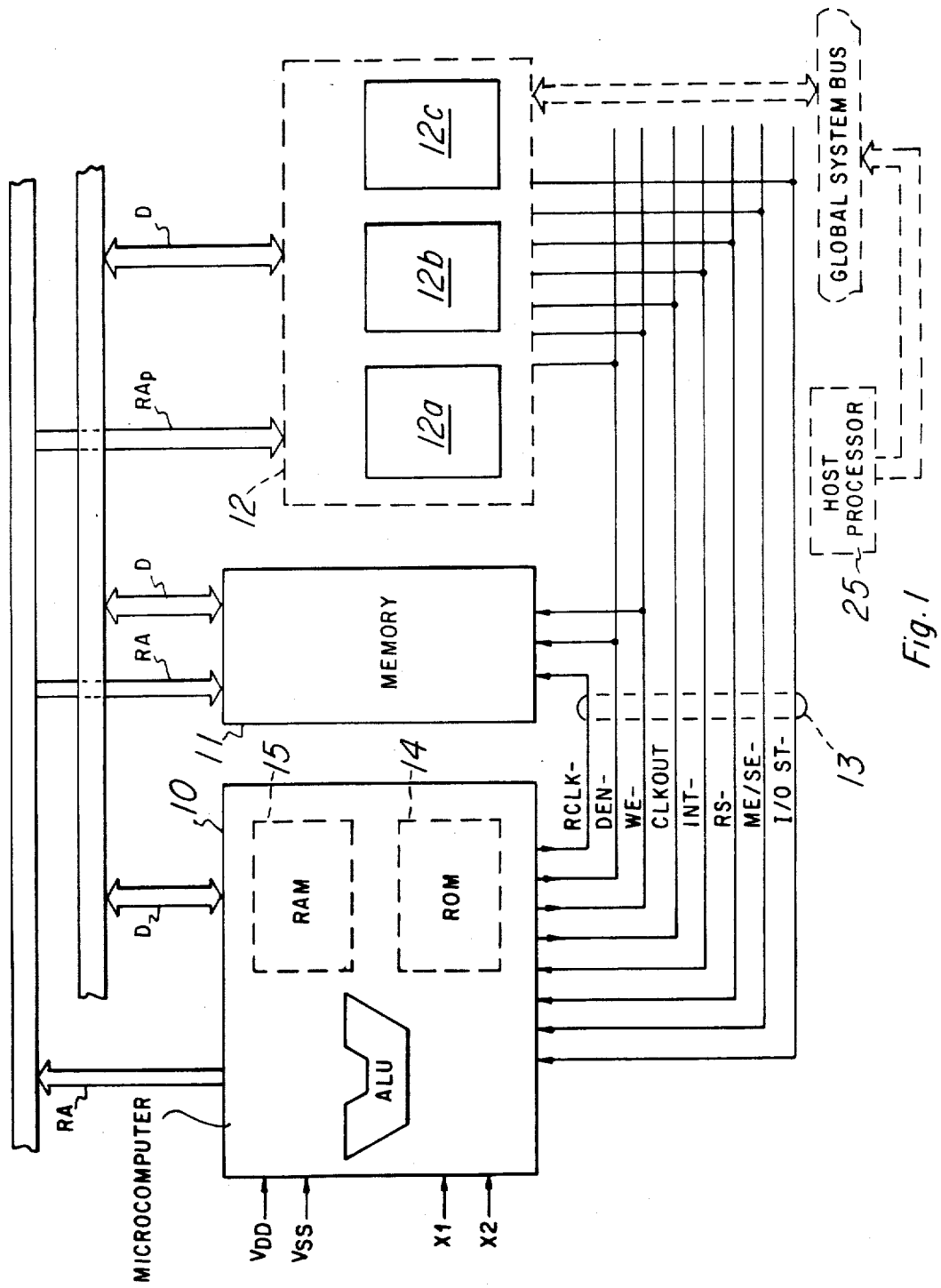
FIG. 1 is an electrical diagram in block form of a microcomputer system employing interface features of the invention.

The microcomputer system to be described herein is primarily used for signal processing, but concepts thereof may be used in interface devices of various configurations, and these devices may be used in many different systems; in one embodiment the microcomputer is used in a system shown in generallized form in FIG. 1. The system may be, for example, a voice communication system, a speech analysis system, a small "personal" or "home" computer with speech capability, an office system with voice message storage and forwarding, a computer terminal having local processing capability with speech output and/or input as well as display and typewriter keyboard, or any one of many applications of such types. The system includes a single-chip MOS/LSI central processing unit or microcomputer 10, along with a program or data memory 11 and input/output interface or I/O devices 12 according to the invention. The I/O devices 12 for a typical system include an analog input channel 12a and an analog output channel 12b which have analog-to-digital and/or digital-to-analog converters, as well as other interface circuits 12c to couple data and controls to and from such peripherals as a keyboard, a CRT display, a disc drive, etc. Often the I/O 12c includes coupling to a general purpose processor 25; that is, the microcomputer 10 is an attached processor in a larger system with interface via the I/O 12c. The microcomputer 10, program data memory 11 and I/O 12 communicate with one another by two multibit, parallel address and data busses, D and RA, along with a control bus 13. The microcomputer 10 has suitable supply voltage and crystal-input terminals; for example, the device employs a single +5 V Vdd supply and ground or Vss, and a crystal is connected to terminals X1 and X2 of the device 10 to control certain system timing. The microcomputer 10 is a very high speed device with a crystal input of 20 Mhz, providing an instruction execution rate of five million per second, in one embodiment, and a master system clock of 5 MHz in this case.

The microcomputer device 10 is a general purpose processor specifically aimed at serving a large class of serial signal processing problems such as digital filtering, signal handling for telecommunications, modems (modulation, demodulation), data compression for linear predictive code (LPC) speech signals, fast Fourier transforms, and in general for virtually all computation intensive analog system functions, including detection, signal generation, mixing, phase tracking, angle measurement, feedback control, clock recovery, correlation, convolution, etc. It is suitable for applications which have computational requirements similar to those for signal processing, such as coordinate transformation, solution of linear differential equations with constant coefficients, averaging, etc. The device 10 is usually interfaced via I/O 12c to a general purpose processor 25 such as an 8080 or 6800 for smaller systems, or an 8600 or a 68000 for high-performance systems, to construct processing apparatus.

It is understood that, even though described in the context of a microcomputer in the preferred embodiment, with an on-chip program ROM 14 and data RAM 15, nevertheless concepts of the invention may be used with a single-chip microprocessor with all off-chip program memory and/or data memory instead of the on-chip memory illustrated. Also, a microcomputer 10 is shown having two separate external program address and data busses instead of multiplexed, bidirectional busses as are now common alternatives. The advantage of separating the busses and separating program and data memory space is speed.

The processor 10 shown as an example is the device described in copending U.S. patent applications Ser. No. 347,859, filed Feb. 11, 1982 and Ser. No. 350,852, filed Feb. 22, 1982, both assigned to Texas Instruments, or described in Electronics, Feb. 24, 1982, pp. 105–110.

In general terms, the system of FIG. 1 functions in the following manner: the microcomputer 10 fetches an instruction word internally by accessing the ROM 14 or externally by sending out an address on the ROM address bus RA to the memory 11 (and RCLK- on control bus 13). If external, the instruction word is received back via the data bus D from the addressed location in the memory 11. This instruction is executed in the next machine cycle (of length of 200 ns defined by a 20 MHz clock or crystal X1, X2) while a new instruction is being fetched; execution of an instruction may include accessing the on-chip RAM 15 for an operand, or writing a result into data RAM 15, and an arithmetic or logic operation in ALU.

In the example processor, a 12-bit instruction address applied internally to ROM 14 or externally to the RA bus directly addresses $2^{12}$ or 4K words of program instruction or constants in ROM 14 and memory 11. When reading from memory 11, a DEN- (data bus enable bar) command is asserted on control bus 13. It is also possible to write into the memory 11, and for this purpose a WE- (write enable bar) command is asserted by the device 10 on one of the control bus lines 13; the memory 11 may contain read/write memory devices in some or all of the address space, so the WE- command permits a write function.

The I/O devices 12 including the analog interface circuits 12a and 12b are addressed as ports; this interface to peripheral devices 12 is accomplished using the address and data busses RA and D and control bus 13, but the I/O devices 12 do not occupy locations in the logical address space like the memory 11 or ROM 14. This is in contrast to memory-mapped I/O.

Port addressing for peripherals 12 employs a 3-bit field RAp from the bus RA to select one of eight 16-bit "ports" P0-P7 in the peripheral circuitry 12. As will be explained, three of these eight addresses are used to define controls for addressing the analog interface circuits 12a and 12b, leaving five for other interface purposes. Each port can be defined as either input or output by DEN- or WE-, so in effect there are sixteen 16-bit ports, eight in and eight out (three in three out are used for analog interface). The selected 16-bit port is addressed by RAp and DEN- or WE-, then access for read or write data is via the bus D. This operation uses one of the two instructions IN or OUT as will be described; on the control bus 13, WE- is active for write or OUT, or DEN- is active for read or IN. A ROM clock RCLK- is active on control bus 13 on every machine cycle except when either DEN- or WE- is active; that is, the memory 11 is activated by RCLK- for possible instruction word access from off-chip in each machine cycle, but if accessing periphral 12 using DEN- or WE- then the RCLK- does not occur.

A reset signal RS- on the control bus 13 clears the program counter and address bus RA (resets to zero), sets the data bus D in a high impedance state, and the memory controls DEN-, WE- and RCLK- in an inactive (high) state. All address and temporary data registers within the microcomputer 10 are cleared by a reset routine in the ROM 14, but the internal RAM is not cleared. In this manner, the peripheral circuitry 12 (such as a main processor) can assert control, or initiate a start-up or power-on sequence.

An interrupt signal INT- on the control bus 13 causes the microcomputer 10 to halt execution (saving the current ROM address) and go to an interrupt vector address, unless interrupts are masked by the program.

The ME/SE- line in the control bus 13 defines the memory expansion mode or systems emulator made for the microcomputer 10. When this pin is held high (at +Vdd), the microcomputer executes from on-chip ROM and off-chip memory 11, but when low (Vss) the chip is in the systems emulator mode and execution is only from the memory 11 which is PROM, EPROM or RAM so the program can be easily changed.

THE MICROCOMPUTER CHIP

Figure 2A:
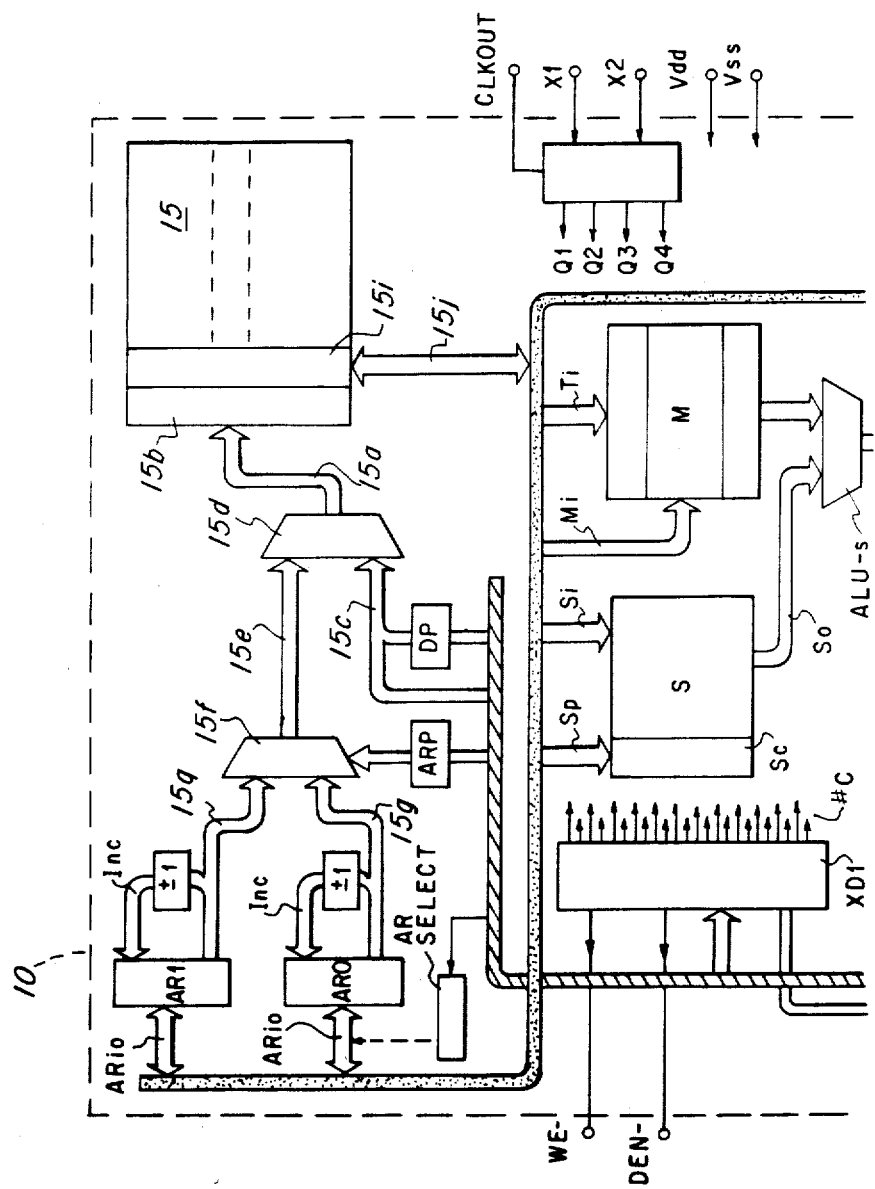
FIG. 2 is an electrical diagram in block form of an MOS/LSI microcomputer device (including a CPU or central processor unit) employed in the system of FIG. 1.
Figure 2B:
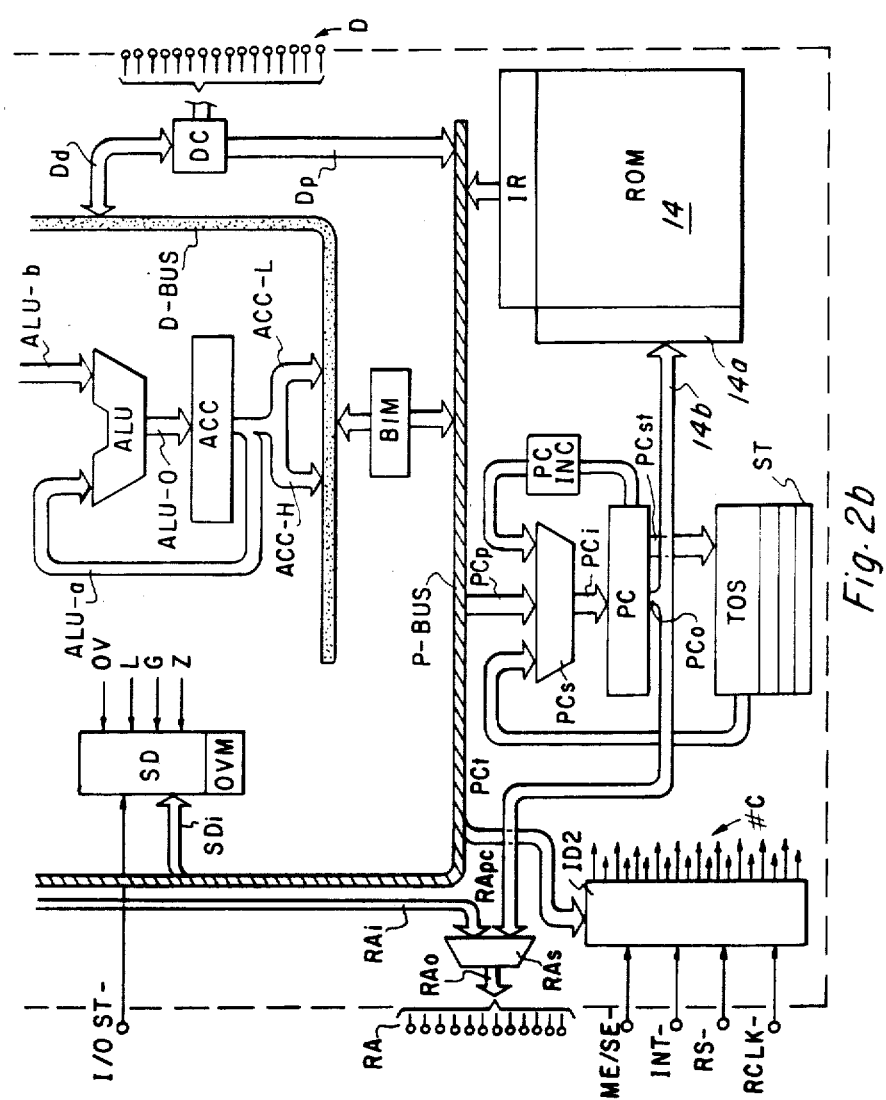

The internal architecture of the microcomputer 10 is shown in a detailed block diagram in FIG. 2. This device is a single-chip semiconductor integrated circuit mounted in a standard 40-pin dual-in-line package or a chip carrier. Sixteeen pins or terminals of the package are needed for the 16-bit data bus D, twelve are used for the address bus RA and the remaining terminals are used for the power supply Vdd and Vss, the crystal X1, X2, and the control bus 13.

In addition to the program and data memory 14 and 15, the microcomputer 10 contains a central processing unit or CPU for the system of FIG. 1, and this CPU includes a 32-bit arithmetic/logic unit or ALU, a 32-bit accumulator Acc to hold operands and results, multiplier M separate from the ALU, a shifter S which is one input to the ALU, status or flag decode SD, and an instruction decoder ID1 which receives the current instruction word and generates the control bits for the CPU and data memory portions of the device 10.

The program memory 14 has associated with it a program counter PC to hold the instruction address used to access the ROM 14 or sent out on bus RA to the memory 11, an instruction register IR to receive the instruction word from ROM 14, a stack ST to save program memory addresses, and an instruction decoder ID2 which receives the current instruction word and generates control bits for the program memory portion of the microcomputer. The instruction decoders ID1 and ID2 of course may be combined into one larger control ROM, or indeed split into smaller PLAs or random logic.

Associated with the data memory 15 are two auxiliary address registers AR0 and AR1 for the data memory 15, a page register ARP to select between the registers AR0 and AR1 for use as the data memory address, and a data page buffer DP to hold certain bits of the data memory address.

The CPU is oriented around two internal busses, a 16-bit program bus (P-Bus) and a 16-bit data bus (D-Bus). Program access and data access can thus occur simultaneously, and the address spaces are separate. The microcomputer is thus of the Harvard architecture, although a bus interchange module BIM permits loading the program counter PC from Acc, for example, or accessing ROM 14 for constants via P-Bus, BIM and D-Bus.

The two major requirements for a signal processing microcomputer are high speed arithmetic and flexibility. Performance is achieved by using separate, principally on-chip program and data memories 14 and 15, a large single accumulator Acc and a parallel multiplier M. A special purpose operation, data move, is defined within the data memory 15 which further enhances the performance in convolution operations. Flexibility has been achieved by defining an instruction set as will be described with reference to Table A, incorporating memory expansion and a single level of interrupt.

The device can be configured with, for example, less than 2K or $2^{11}$ words of on-chip program memory 14 yet the architecture allows for memory expansion up to 4K or $2^{12}$ words by the addition of external program memory in the memory 11. In addtion, a separate mode allows the device 10 to be configured as a system emulation device; in this "system emulator" mode, the entire 4K memory space is external and the ROM 14 is not used.

THE CPU

The arithmetic/logic unit or ALU consists of thirty-two parallel stages, each separate stage performing an arithmetic or logic function on its two input bits and producing a one-bit output and carry/borrow. The particular function performed on data passing through the ALU is defined by the current 16-bit instruction word in IR which is applied by the program bus P-Bus to an instruction decoder ID1. The ALU has two 32-bit data inputs ALU-a and ALU-b, and a 32-bit data output ALU-o to accumulator Acc. The ALU-a input is always from the accumulator Acc and the ALU-b input is always either from the shifter S or from a 32-bit product register P in the multiplier M. The source of the ALU-b input is defined by an input select circuit ALU-s which selects from these two alternatives, based upon the contents of the current instruction word, i.e., the outputs #C of the decoder ID1. The shifter S receives a 16-bit input Si from D-Bus and produces a 32-bit output So which is the input Si shifted from zero to fifteen places to the left. Left-shifted data is zero-filled, i.e., all right-hand bit positions are filled with zeros when data is shifted out to the left. One feature is that the high-order bit is sign extended during shift operations. The ALU operates in twos-complement. The shifter S includes a shift control Sc loaded with a four-bit value from P-Bus via lines Sp, so an arithmetic instruction can directly define the number of bits shifted in the path from D-Bus to the ALU-b input.

In this description, the LSB is considered to be on the right and the MSB on the left, so left-shift is toward more significant bits. Bit-O is the MSB and bit-15 is the LSB. Data is usually handled in signed 2's complement in this architecture.

The multiplier M is a 16×16 multiplier using carry feed-forward, constructed in dynamic/static logic, to implement Booth's algorithm. One input to the multiplier M is the T register which is a 16-bit register for temporary storage of the multiplicand received from D-Bus via lines Ti. The other 16-bit input is via lines Mi from the D-Bus; this multiplier input may be from the data memory 15 or may be a 13-bit multiply-immediate value derived directly from the instruction word (loaded right-justified and sign-extended).

The ALU always receives the contents of the accumulator Acc as its ALU-a input, and always stores its output in Acc, i.e., Acc is always the destination and the primary operand. The unit will add, subtract and perform the logic operations of And, Or and Exclusive Or. The logic operation results are between the lower half of Acc (bits 16-31) and a 16-bit value from the data memory 15. Due to passing the data memory value through the shifter S (with zero shift), the operand for the logical operation result of the MSBs (bits 0-15) is zero. The final 32-bit result reaching the accumulator is thus in two parts: Bits 0-15 will be Acc bits 0-15 Anded (or Or'ed, etc) with zero; bits 16-31 of the result will be Acc bits 16-31 Anded (etc.) with the data memory value. The accumulator Acc output, in addition to the 32-bit ALU-a input, includes high and low 16-bit outputs Acc-H (bits 0-15) and Acc-L (bits 16-31); separate instructions SACH "store accumulator high" and SACL "store accumulator low" are provided for storing high and low-order Acc 16-bit words in the data memory 15.

The status decoder SD monitors the Acc whenever an instruction which updates Acc is executed. Four bits of SD are OV, L, G and Z. Accumulator overflow (or underflow) is indicated by the OV bit, Acc contents less than zero is indicated by the L bit, Acc greater than zero indicated by the G bit, and Acc equal zero indicated by the Z bit. Upon interrupt the OV bit is saved in an overflow flag register, but the other bites are available only up to the time the next accumulator instruction is executed.

The accumulator overflow mode is a single-bit mode register OVM (included in SD), directly under program control, to allow for saturated results in signal processing computations. When the overflow mode OVM is reset, overflow results are loaded via ALU-o into the accumulator Acc from the ALU without modification. When the overflow mode is set, overflow results are set to the largest, or smallest, representable value of the ALU and loaded into the accumulator Acc. The largest and smallest value is determined by the sign of the overflow bit. This allows a saturated Acc result in signal processing applications, modeling the saturation process of analog signals.

A separate status bit in SD monitors the condition of the currently used auxiliary register AR0 or AR1 and detects the all-zero condition of the least significant nine bits of the current auxiliary register (i.e. loop counter portion). This bit is used for a branch instruction conditioned on non-zero for the auxiliary register, BARNZ or "branch on auxiliary register non-zero."

The input/output status bit I/O ST- is an external pin which is part of the control bus 13 and provides "branch on I/O zero" instruction BIOZ to interrogate the condition of peripheral circuits 12. A zero level on the I/O ST- pin will cause a branch when sampled by the BIOZ instruction.

The bus interchange module BIM exchanges the low-order twelve bits of the 16-bit value on the D-Bus with the low-order twelve bits on the P-Bus. This operation is not available to the programmer as an instruction, but instead is needed as an inherent operation in instructions such as table look up TBLR A or table write TBLW, or in a call-accumulator instruction CALLA where a computed address in Acc may be used to reach a subroutine. A 16-bit value from IR on the P-Bus may be loaded via BIM to D-Bus for storing in RAM 15, for example, in table-read.

PROGRAM MEMORY ADDRESSING

The program memory 14 is a ROM which is partitioned X16 to produce a 16-bit output to instruction register IR, and this ROM employs a decoder 14a which selects one 16-bit instruction word based on an 11-bit or 12-bit address on input lines 14b. In the example embodiment, the ROM 14 contains less than 2K words, so an 11-bit address can be used, but the on-chip program memory could be expanded to 4K with a 12-bit address. The circuit of the ROM 14 is expecially adapted for access during a machine cycle. The address input 14b is received from the program counter PC which is a 12-bit register containing the address of the instruction following the one being executed. That is, at the time when the control bits #C are valid at the outputs of the instruction decoders ID1 and ID2 for one instruction, PC contains the address of the next instruction. After an address in PC goes into decoder 14a to read the next instruction from ROM 14 into IR, the program counter PC is incremented via PCinc in preparation for another instruction fetch; i.e. PC is self incrementing under control of a #C control bit from ID2. The output PCo from the program counter PC is also applied via lines RApc and selector RAs (and output buffers not shown) to the external RA bus via output lines RAo and twelve output pins of the microcomputer device. The RA bus (RA0 through RA11) contains the PC output via RApc when the selector RAs is in one mode, or contains the 3-bit port address input RAi when executing I/O instructions IN and OUT. Whenever the address in PC is above the highest address in ROM 14, off-chip program addressing to memory 11 is assumed; however, the device is designed to operate principally with the on-chip ROM 14, so for many uses of the device off-chip fetches for program instructions would never be needed. The program counter PC may be loaded via input PCi and selector PCs from the P-Bus for branch or call instructions, or loaded from the accumulator Acc via Acc-L, D-Bus, BIM, P-Bus, PCp and PCi in a "call accumulator" CALLA instruction or table-read and table-write.

The register stack ST is used for saving the contents of PC during subroutine and interrupt calls. In the illustrated embodiment, the stack ST contains four 12-bit registers constructed as a first-in, last-out push-down stack, although a larger or smaller number of registers could be used. The current contents of PC are saved by "pushing" onto the top-of-stack register TOS via lines PCst. Successive CALL instructions will keep pushing the current contents of PC onto TOS as the prior contents are shifted down, so up to four nested subroutines can be accomodated. A subroutine is terminated by execution of a return instruction RET which "pops" the stack, returning the contents of TOS to PC via lines PCt, selector PCs and input PCi, allowing the program to continue from the point it had reached prior to the last call or interrupt. When TOS is popped, the addresses in lower registers of ST move up one position. Each subroutine, initiated by a call instruction or an interrupt, must be terminated by a RET instruction.

In an example embodiment, the ROM 14 contains 1536 words, so the remainder of the 4K program address space, 2560 words, is off-chip in the memory 11. When the memory expansion control pin ME/SE- is high, at logic 1, the device interprets any program address in PC in the 0-to 1535 range as being an on-chip address for the ROM 14, and any address in the 1536–4095 range as being an off-chip address so that the PC contents are sent out via RApc and RAo to the RA bus. An output strobe RCLK- generated by the decoder ID2 for every machine state enables the external memory 11 (except when IN or OUT instructions are being executed). When off-chip program memory 11 is accessed, the instruction word read from memory 11 is applied to the external bus D and thus to the internal P-Bus via input/output control DC and lines Dp; this is a 16-bit instruction and, like the output of ROM 14 via IR, it is loaded into decoders ID1 and ID2 for execution, or 12-bits are loaded into PC via PCp, or otherwise used just as an on-chip instruction fetch.

When the ME/SE- pin is at zero the device enters the system emulator mode wherein the entire 4K program address space is off-chip, so all PC addresses are applied to the RA bus via RApc and RAo. This mode is necessary when a user is developing systems or programs, prior to arriving at a final version of code for the ROM 14. That is, the microcomputer 10 can operate with no code permanently programmed into the ROM so that new programs (stored in RAM or EPROM in the memory 11) can be tested and debugged, then when the final code is established the chips 10 are produced in large volume with this code mask-programmed into the ROM 14.

In either mode, the first two program addresses 0000 and 0001 are used for the reset function. When the reset pin RS- is brought low, an address of all zeros is forced into the program counter PC, Also, the third address is reserved for an interrupt vector; when the INT- pin is brought low, an address of 0002 is forced into PC to begin an interrupt routine.

DATA MEMORY ADDRESSING

The data memory 15 in the example embodiment contains 144 16-bit words, and so an 8-bit address is needed on address input 15a to the RAM address decoder 15b. However, the RAM 15 may be constructed with up to 512 words, requiring a 9-bit address, so the addressing arrangement will be described in terms of address bits which are unused in some embodiments. Each 128 word block of the RAM 15 is considered to be a page, so a 7-bit address field in an instruction word from program memory 14 on P-Bus via input 15c is used to directly address up to 128 words of data memory 15, within a page, and the page is selected by a data page buffer DP. Alternatively, for indirect addressing, two auxiliary registers AR0 and AR1 are employed in the example embodiment; however, up to eight of these 16-bit auxiliary registers may be used, with the particular one specified at a given time being used as the source of the indirect address for the RAM 15 and this one is defined by the auxiliary register pointer ARP. With two registers AR0 and AR1, the pointer ARP is only one bit, but for an embodiment with eight auxiliary registers the pointer ARP is a 3-bit register. The 16-bit auxiliary registers AR0 and AR1 are under control of indirect-address instructions, or store, load or modify auxiliary register instructions SAR, LAR, and MAR, as will be described. Nine-bit addresses from the low-order parts of the auxiliary registers may be applied to the address input 15a via selector 15d, lines 15e, selector 15f, and lines 15g, the paths being defined by control bits #C from ID1. When one of the auxiliary registers is to be the source of the RAM address, the selector 15d uses the value on lines 15e as the address input 15a, whereas if the P-Bus is to be the source of the RAM address the selector 15d uses a 7-bit address from input 15c and a 1-bit (expandable to 3-bit or 4-bit) page address from the data page register DP. The selector 15f is controlled by the pointer ARP which is loaded from P-Bus as defined by an instruction. The auxiliary registers are used for indirect addressing wherein an instruction need not contain a complete address for RAM 15 but instead merely specifies that an auxiliary register is to be used for this address; such instructions can also specify increment or decrement for the auxiliary register selected, in which case the nine LSBs of AR0 or AR1 are changed by +1 or −1 via paths Inc. The auxiliary registers may be thus used as loop counters. The auxiliary registers are accessed by the D-Bus via lines ARio so these registers may be used as miscellaneous working registers, or may be initially loaded to begin a loop count.

The data memory 15 is accessed using the D-Bus and an input/output circuit 15i, via lines 15j. Construction of the data memory is such that a data move wholly within the RAM 15 is permitted, according to a feature of the microcomputer 10. Under instruction control, the data at one address can be moved to the next higher location within one machine cycle without using the ALU or D-Bus. Thus during an add, for example, the accessed data can be also moved to the next higher address.

INPUT/OUTPUT FUNCTIONS

Input and output of data from the microcomputer chip 10 uses the data bus D and two of the lines of the control bus 13, these being data enable bar DE- and write enable bar WE-. Two instructions, IN and OUT, are employed for the data input and output functions. The external data bus D is coupled to the internal data bus D-Bus by the input/output control and data buffers DC and lines Dd. The output buffers in DC are tri-state, so the output to data bus D from DC is always placed in a high impedance state except when OUT is being executed; to this end, one of the controls #C from the instruction decode ID1 sets the output buffers in high impedance state whenever OUT is not decoded. When the instruction IN is present, the control DC activates sixteen input buffers, so the external data bus D is coupled to the internal D-Bus via DC and lines Dd for data input. When the OUT instruction is decoded, a control #C from ID1 activates output buffers in DC so the internal D-Bus is coupled via Dd and DC to the external bus D.

Execution of an IN instruction will also generate a data enable DEN- strobe on line 13a from ID1, and will couple the D-Bus to the RAM 15 via 15i and 15j, so the data from external will be entered into on-chip data memory. The intended uses of the microcomputer as a signal processor require hundreds or thousands of accesses to RAM 15 for every off-chip reference. That is, a value will be fetched from off-chip then convolution or like operations performed using this new value and other data in the RAM 15, so thousands of instruction executions will transpire before another off-chip reference is needed. For this reason, the architecture favors internal data manipulation over off-chip data access.

Execution of an OUT instruction causes generation of an off-chip write enable WE- strobe on line 13b from ID1 and outputs data from RAM 15 via 15i and 15j, D-Bus, lines Dd and buffer DC to the external bus D. Referring to FIG. 1, this data may be written into one of the ports P0-P7 (selected by the 3-bit RAi RAp value) in the peripherals 12.

Implicit in both the IN and OUT instructions is a 3-bit port address on lines RAi from ID1. This address is multiplexed onto the three LSBs (RA9-RA11) of the external address bus RA via selector RAs. Up to eight peripherals may thus be addressed. The remaining high order bits of the RA bus outputs are held at logic zero during these instructions.

THE INSTRUCTION SET

The microcomputer 10 of FIGS. 1 and 2 executes the instruction set of Table A. The Table shows in the first column the mneumonic or assembly language name of each instruction used in writing source code, followed in the second column by the object code in binary which is the form the code appears in the ROM 14 and in the instruction register IR. This binary code is decoded in ID1 and ID2 to generate all of the controls #C to execute the desired operation by accessing various busses and registers and setting the functions of the ALU. The Table also gives the number of cycles or machine states employed by the microcomputer in executing the instruction; note that all instructions except branches, calls, table look-up and input/output are executed in one state time. The microcomputer is not microcoded; the standard ALU instructions are executed in one state. The Table also shows the number of instruction words or opcodes needed to define each instruction; it is important to note that only branches and call direct require two instruction words. The right-hand column of Table A is a brief description of the operation for each instruction.

Most of the instructions of Table A show the low-order eight bits (bits 8-15) as "IAAAAAAA", which is the direct or indirect RAM 15 address for one operand. If the "I" bit, bit-8, is 0, the direct addressing mode is used, so the "A" field of the instruction word, bits 9-15, is employed as a direct address connected from IR through P-Bus, lines 15c and selector 15d to address input 15a. In this direct addressing mode, the auxiliary registers AR0-AR1 are not used.

For the instructions containing "IAAAAAA", the indirect addressing mode is specified by a 1 in the I field, bit-8, of these instructions. The input address on lines 15a for the RAM 15 will in this case be obtained from one of the auxiliary registers AR0 or AR1, and bit-15 will select which one. If bit-15 is 0, AR0 is used; if bit-15 is 1, AR1 is used. Thus bit-15 coupled from IR via P-Bus controls the selector 15f (and can be loaded into the ARP register). Since the number of auxiliary registers is expandable to eight, bits 13-15 of these indirect-address instructions are reserved for use with a 3-bit selector 15f and ARP register to define one-of-eight in the indirect addressing mode. Bit-10 to bit-12 are controls in indirect addressing: bit-10 causes the addressed auxiliary register to be incremented if 1, or no change if 0; bit-11 causes the addressed AR to be decremented if 1 or no change if 0; bit-12 if 0 causes bit-15 to be loaded into ARP after execution of the current instruction, or if 1 leaves the ARP unchanged.

The shift code SSSS used in several instructions of Table A is a four-bit field loaded into shift control Sc via Sp to define the number of spaces (zero to fifteen) that the data coming from the RAM 15 via D-Bus is left shifted as it passes through the shifter S on the way to the ALU-b input.

Although not material to the structure described herein, assembly language formats using the instruction set of Table A employ "A" to designate direct addressing and "@" to designate indirect. Thus, "ADD S,A" means add contents of memory location defined by the A field of the instruction word. "ADD A@" means add using contents of the data memory location addressed by the auxiliary register AR0 or AR1 selected by the existing contents of AR P. ADD S@+ means add using current contents of ARP to define AR then increment this auxiliary register for loop counting; ADD S@ is the same as previous except decrement by 1. ADD S@−, AR is the same as previous except ARP is loaded with the value of bit-15 to define a new auxiliary register for subsequent operations.

The descriptions given in the right-hand column of Table A assume direct addressing. For indirect addressing, the above explanation applies.

The ADD instruction thus adds the 16-bit contents of RAM 15 (at location 0AAAAAAA for direct, or the contents at the locations in RAM 15 selected by the chosen AR if indirect), shifted SSSS spaces left, to the 32-bit contents of the Acc, and stores the result in the Acc. ADDH does the same except only the high-order half of Acc is the source of one operand and destination of the result, and no shift is performed.

The subtract instructions SUB and SUBH subtract the addressed RAM 15 data from the accumulator and store the result in Acc, but are otherwise the same as add. The load instruction LAC loads Acc with the 16-bit data addressed by IAAAAAAA which is left-shifted by SSSS bits. Only ADD, SUB and LAC specify a shift.

There are four instructions associated with the auxiliary registers: SAR, LAR, LARK and MAR. Store auxiliary register SAR causes the contents of one of the auxiliary registers defined by RRR to be stored in the memory location IAAAAAAA; the load AR instruction LAR is the reverse of SAR. The AR selected in SAR or LAR is defined by a pointer RP loaded from P-Bus with the RRR field of the instruction word, determining which of the auxiliary registers is coupled to D-Bus via lines ARio. With the LARK instruction a constant K from IR (bits 8–15) is loaded into the AR defined by RRR; this 8-bit constant K is right-justified and MSBs set to zero in the 16-bit auxiliary register. The modify auxiliary instruction MAR causes one auxiliary register to be modified by bit-10 to bit-12 as above, but no add or access to memory 15 is implemented. The MAR code is operative only in the indirect mode, I=1; in direct mode this instruction results in no-op.

The input/output instructions are written in assembly language as "IN PA, A" or "OUT PA, A", where PA is the 3-bit port address PPP output on bits 9–11 of the RA bus (generated from the decoder ID1 and coupled via lines RAi). IN enables DEN- and disables RCLK-, while OUT enables WE- and disables RCLK-. The peripheral devices 12 decode RA9-RA11 to select one of eight 16-bit ports P0-P7, locations for read or write via the bus D. These instructions use two machine states so that the data input pins of bus D are free on the second state to allow external fetch of the next instruction from memory 11 instead of ROM 14.

The store accumulator instructions SACL and SACH, written as "SACL X,A" in assembly, cause the low or high order bits of Acc to be left-shifted XXX places and stored in the data memory 15 at the location defined direct or indirect by IAAAAAAA. The X field is not fully implemented in the example embodiment; for SACH only X=0, X=1 and X=4 are allowed. This shift is implemented in the accumulator Acc circuitry itself rather than in the shifter S or in ALU.

The arithmetic and logic instructions without shift code are ADDH, ADDS, SUBH, SUBS, SUBC, ZALH, ZALS, EXOR, AND, OR and LACK. These are all written as ADDH A, for example, in assembly language. ADDH causes the 16-bit data from the defined location in RAM 15 to be added to the high-order half of Acc and stored in the high-order half of Acc; actually the data from RAM 15 is left shifted sixteen bits in shifter S as it goes from D-Bus to the ALU-b input. The ADDS instruction means that the sign extension is suppressed in the shifter S; the data from RAM 15 defined by IAAAAAAA is treated as a 16-bit positive number instead of a signed 2's complement integer. SUBH and SUBS correspond to ADDH and ADDS except subtract is performed in the ALU.

The conditional subtract instruction SUBC is used in divide operations. The contents of the defined location in RAM 15 are subtracted from the contents of Acc and left-shifted fifteen bits, producing an ALU output ALU-o which, if equal to zero is left-shifted by one bit and a +1 is added, with the result stored in Acc. If the ALU output is not equal to zero then it is left-shifted by one-bit and stored in Acc (the +1 is not added). SUBC is a two-cycle instruction that assumes the accumulator is not used in the following instruction. If the following operation involves Acc then a NO OP instruction should be inserted after SUBC.

The "xero accumulator load high" instruction ZALH fetches the 16-bit word at the addressed location in the RAM and loads it into the high-order half of Acc (bits 0–15); the Acc has been zeroed, so the low-order bits 16–31 remain zero. The shifter S is in the data path from D-Bus via ALU to Acc, so a 16-bit shift is performed in ZALH to move the data to the high-order half. The ZALS instruction fetches a word from RAM and loads it into the low-order half of the zeroed Acc, with sign extension suppressed in the shifter S.

The logic operations EXOR, AND and OR are performed in 32-bit format, even though the operand fetched is sixteen bits. For EXOR, the high-order half of Acc is Exclusive Or'ed with zeros, concatenated with Exclusive Or of the fetched data with the low-order half of Acc, both halves of the result being stored in Acc. The same applies to OR and AND.

The load accumulator instruction LACK causes an 8-bit constant contained in the eight LSB's of the instruction word to be loaded into the eight LSB's of the Acc, right justified; the upper twenty-four bits of Acc are zeroed. To accomplish this operation, the instruction word on P-Bus from IR after (ID1 and ID2 are loaded, of course), is coupled to the D-Bus by BIM, and thence to the ALU-b via shifter S (with no shift). The ALU performs "pass ALU-b" or add zeros to b, leaving the constant in Acc.

The data shift or data move instruction DSHT causes the contents of the defined location in the RAM 15 to be moved to the defined location plus one. This is accomplished internal to the RAM 15 without using the ALU or data bus D-Bus. The operation cannot cross a page boundry, however.

The "load T" instructions are used to set up multiply operations. LT causes the T register to be loaded from RAM 15 with the value defined by IAAAAAAA. The "load T with data move" instruction LTD employs an operation like DSHT in the RAM; the T register is loaded with the contents of the RAM 15 location defined by IAAAAAAA, then this same value is shifted to location IAAAAAAA+1, and also the contents of Acc is added in ALU to the contents of the P register with the result going to Acc. The LTA instruction is the same as LTD but without data move; the T register is loaded from RAM 15 and the P register is added to Acc, with result to Acc.

The multiply instruction MPY causes the 16-bit contents of T register to be multiplied in multiplier M (not using ALU) by the value from RAM 15 on the input Mi from D-Bus, with the 32-bit result going to the P register. The "multiply constant" instruction MPYK causes the 16-bit contents of T register to be multiplied by a 13-bit constant C from the opcode in IR; the 32-bit result stays in P register. For MPYK, the constant is connected from IR to Mi via P-Bus, BIM and D-Bus.

The "load data page" instructions LDPK and LDP cause the data page register DP to be loaded with up to eight bits from the opcode itself or from the defined location in RAM 15. In the embodiment shown, the DP register is only one bit, but in other embodiments with a larger RAM 15 the DP register contains up to eight bits. The page address remains the same in DP until a new load page instruction occurs.

The load status and store status instructions LST and SST are used in call subroutine or interrupts to save the contents of the status circuits SD, or restore status SD. These instructions are used instead of hard wired circuits for performing this function.

The disable and enable interrupt instructions DINT and EINT are used to mask or unmask the interrupt capability, i.e., these instructions reset or set a latch which determines whether or not the microcomputer 10 responds to the INT- pin.

An absolute value instruction ABS functions to assure that the accumulator contains only an absolute value, i.e., if Acc is less than zero, the absolute value of Acc is loaded into Acc, but if Acc is greater than zero there is no change. Similarly, the zero accumulator instruction ZAC clears Acc.

The overflow mode instructions RAMV and SAMV cause the overflow mode latch OVM in the status decode SD to be set to 1 or reset to 0. Whe OVM is set, the ALU output is set to its maximum or minimum before loading into Acc upon overflow. This simulates the effect of saturating an amplifier in an analog circuit, and is useful in signal processing.

Three P register instructions PAC, HPAC and SPAC are used in manipulating data after a multiply MPY or MPYK. PAC loads the accumulator with the contents of the P register by passing the 32-bit data through the ALU without performing any operation to modify the data; actually the ALU-a input is zeroed and an Add is executed. The APAC instruction adds the contents of the P register to the contents of Acc, with the result going to Acc. Similarly, the SPAC subtracts the contents of P register from Acc, result to Acc.

The subroutine instructions are CALL, CALLA and RET. CALL is a two-word instruction; the first word is the opcode and the second is the absolute address of the first instruction in the subroutine. When CALL is decoded in ID2, PC is incremented to fetch the next instruction word which is the address, then the incremented contents of PC are pushed to stack ST. The subroutine ends in return RET which causes the address on TOS to be popped and loaded into PC. To save status, SST must be used before CALL, and LST inserted after RET. The CALLA instruction is unique for a Harvard architecture machine; this uses the contents of Acc as the subroutine address rather than using the next location addressed by PC+1. The low-order bits of Acc are transferred via Acc-L and BIM to the P-Bus and thus via PCp to the program counter PC. The incremented PC is saved in CALLA by pushing to ST just as in a CALL.

The table look up instructions TBLR and TBLW also employ the Acc as an address source. These instructions require three states to execute. The RAM 15 location defined by IAAAAAAA is transferred via D-Bus and BIM to P-Bus, and thus via PCp to PC, from whence this address is applied to ROM 14 or via RApc to the external RA bus.

The branch instructions all require two words, the first being the opcode and the second at PC+1 being the address. The low-order bits 8-15 of the branch opcodes are unused. Unconditional branch B loads the word at PC+1 into PC as the next address. BARNZ is conditional upon whether or not a loop counter, one of the auxiliary registers defined by ARP, is not-zero. BV causes a branch if the overflow bit OV in the status decode SD is a 1. BIOZ causes a branch if the IO bit from I/O ST- is active-low, corresponding to a 1 in the status decoder SD. The six instructions BLZ, BLEZ, BGZ, BGEZ, BNZ and BZ are all dependent upon the defined condition in SD reflecting the condition in Acc.

SYSTEM TIMING

Figure 3:
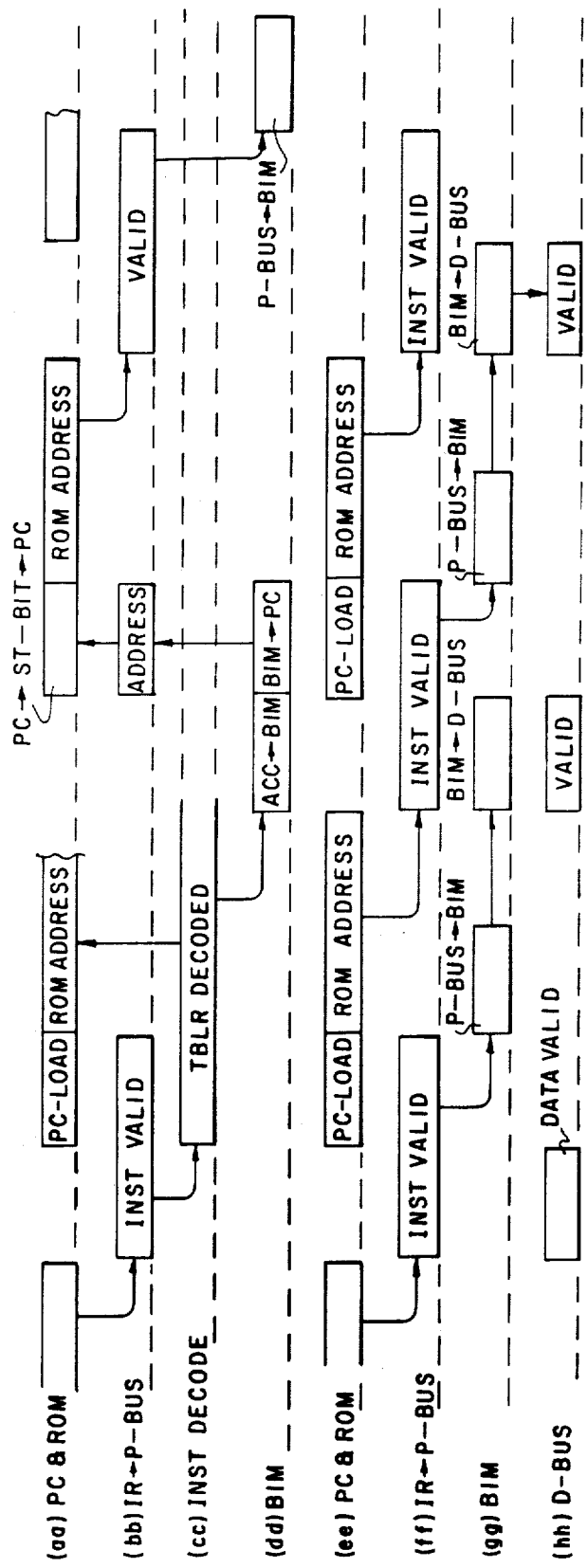
FIGS. 3a–3dd are timing diagrams showing voltage or event vs. time in the operation of the microcomputer of FIG. 2.

Referring to FIG. 3a et seq the timing of the system of FIG. 1 and the CPU chip of FIG. 2 is illustrated in a sequence of voltage vs. time waveforms or event vs. time diagrams. The chip 10 includes a clock generator 17 which has two external pins X1 and X2 to which a crystal (or external generator) is connected. The basic crystal frequency is up to 20 MHz and is represented by a clock $\Phi$ of FIG. 3a. This clock $\Phi$ has a period of 50 ns, minimum, and is used to generate four quarter-cycle clocks Q1, Q2, Q3 and Q4 seen in FIGS. 3b-3e, providing the basic internal timing for the microcomputer chip 10. A set of four quarter cycle clocks Q1 to Q4 defines one machine state time of 200 ns, minimum; the states are referred to as S0, S1, S2, in FIG. 3. The clock generator 17 produces an output CLKOUT, FIG. 3f, on one of the control bus lines 13. CLKOUT has the same period as Q1, but 50% duty cycle and beginning at the midpoint of Q1. This output is used for timing or synchronizing external elements of the system of FIG. 1.

Internally, the microcomputer 10 executes one instruction per state time for most types of instructions, so five million instructions per second are executed 20 MHz clock rate. Of course, some instructions such as input/output, branch, call or table look-up require two or three state times. Assuming a sequence of single-state instructions such as add, load, store, etc., a new address is loaded into PC during each Q3 as seen in FIG. 3g, then the ROM 14 is addressed during Q4 and Q1 so an instruction word output is produced from IR onto P-Bus valid in the next Q2 and continuing through Q3, as seen in FIG. 3h. The ROM 14 access time is thus about 100 ns. If an external instruction fetch from memory 11 is used, the same access time applies. The instruction decoders ID1 and ID2 receive the instruction word from P-Bus during Q3 as seen in FIG. 3i, and most of the decoder outputs #C are valid during Q1, although some fast controls are available in Q4. For direct addressing of the RAM, the address on bit-9 to bit-15 of P-Bus is immediately gated into the RAM decoder 15b when P-Bus becomes valid, but in either direct or indirect the RAM address is valid by the beginning of Q3 as seen in FIG. 3j. For RAM read, the data output via 15j to D-Bus is valid on Q4, FIG. 3j, and this data passes through the shifter S, FIG. 3k, and is available as an ALU input during Q1, FIG. 3l. The ALU controls #C (Table B) are valid in Q2 and the ALU output ALU-o is available during Q3. The accumulator Acc is loaded from ALU in Q4, FIG. 3m, then saturated in the next Q1.

It is thus seen that an ADD instruction, for example, for which fetch began at Q3 of the S0 state in FIGS. 3a-3m, will be completed, i.e., the result loaded into Acc, in Q4 of state S2, then the saturated Acc available in Q1 of state S3 could be loaded to D-Bus in Q2. There is substantial overlap of instruction execution. A new instruction fetch begins during Q3 of each state time for one-state instructions, so execution of two more instructions may have begun before one is finished.

Not shown in FIGS. 3a-3m is the write-RAM function. The RAM 15 is always written into during Q2. Addressing the RAM is always during Q3, however. Thus, an instruction such as "store accumulator low" SACL is illustrated in FIGS. 3n and 3o. The RAM address is received from the instruction register via P-Bus on Q3 of S1 (assuming the SACL instruction was fetched beginning at Q3 of S0), and the write will not occur until Q2 of state S2. During the read slot, Q4 of S1, a refresh occurs for the addressed row of the RAM, then the same address stays until Q2 of state S2 for the write. The D-Bus is loaded from Acc during this same Q2, see FIG. 3n.

If the accumulator must perform the saturate function in the overflow mode, i.e., OVM set to 1, this will be performed after the load accumulator function of FIG. 3m. That is, for the ADD instruction of FIGS. 3a-3m, the Acc is saturated during Q1 if the next state S3, so that when the accumulator is accessed by the following instruction it will be available to load the D-Bus on Q2.

When an instruction uses the data move function within the RAM 15, the move operation occurs during Q1 as illustrated in FIG. 3o. Also, if the increment loop counter function is performed for the auxiliary registers AR0 or AR1, the increment (or decrement) is executed in Q1. The T register, auxiliary registers AR0 or AR1, ARP latch, DP register and stack ST registers are each loaded during Q2 of any state time if these functions are included in the current instruction.

The bus interchange module BIM always executes a transfer from D-Bus to P-Bus beginning in Q2, if this function is defined by the instruction. The transfer from P-Bus to D-Bus by BIM is begun during Q4. The D-Bus is precharged on Q3 of every cycle, so no data can carry over on D-Bus through Q3 of any state, nor can data be loaded to or from D-Bus during Q3.

The program counter PC is incremented by the PCinc path during Q3 of each state time. That is, the load PC function of FIG. 3g is the incremented value just generated.

Execution of a branch instruction is illustrated in FIGS. 3p-3r. If the instruction loaded into the decoders ID1 and ID2 during Q3 of state S0 is a branch, the status decode SD bits from the previous instruction are valid during Q1 of S1 so the decision of branch or not is made at this point. Meanwhile, of course, another instruction fetch has begun so if the branch condition is met the instruction delivered to P-Bus during Q2 of S1 is used as the next address but not executed, i.e., not loaded to ID1 and ID2; if the condition is not met, however, this instruction is discarded i.e., stays in P-Bus until precharge. Assuming the condition is met, the branch address is loaded from IR via P-Bus to PC during Q3 of S1, and the new instruction delivered to IR and P-Bus in Q2 of S2 then decoded and executed beginning at Q3 of S2, FIG. 3r.

A CALL instruction is executed in the same time sequence as a branch, seen in FIGS. 3p-3r, except no SD evaluation is needed, and the original PC+1 is pushed to stack ST during Q3 of S1.

A return instruction RET is a two cycle instruction as illustrated in FIGS. 3s-3u. If the instruction loaded into the decoders ID1 and ID2 during Q3 of state S0 is RET, the instruction fetch which began with "PC increment and load PC" in Q3 of S1 is discarded and a pop stack function is performed in Q3 of S1 so the next instruction fetch is to the return address. The instruction fetched during Q4 of S1 is then decoded and executed beginning at Q3 of S2.

Input (or output) instructions are executed in two cycles as illustrated in FIGS. 3v-3z. Assume the opcode loaded into the decoder ID2 in Q3 of S0 is IN, seen in FIG. 3x. The instruction fetched beginning at Q3 of S0 is not used; execution is inhibited by the decode of IN so it is never loaded from IR to P-Bus. The contents of PC at Q3 of S1 are saved until Q3 of S2 for the next instruction fetch; that is, PC is recirculated back to PC by the increment path, but no increment is performed. The controls #C produced from decode of IN are available for two states. The RAM address is loaded from P-Bus on Q3 of S1, seen in FIG. 3y, and the data input reaches D-Bus on Q4 of S1 and is written into RAM 15 during Q2 of S2. The DEN- control is active from Q4 of S1 through Q2 of S2 for the IN function. An OUT instruction is executed like IN except the RAM 15 is read during Q4 of S1 and the WE-control is active instead of DEN-.

A table look up instruction is executed as shown in FIGS. 3aa-3dd. The TBLR opcode is decoded beginning at Q3 of S0 and causes the Acc to be copied via D-Bus to BIM in Q2 of S1, then PC is loaded with this Acc value via P-Bus from BIM in Q3 of S1 so the content of Acc is used as the next instruction fetch address. Meanwhile, execution of the instruction fetched beginning at Q3 of S0 is inhibited by preventing the ROM read control #NRIR from copying IR to P-Bus (the ROM 14 output), at Q2 of S1. The incremented contents of PC from Q3 of S0 are pushed to ST during Q3 of S1, then popped at Q3 of S2 as the following instruction address. The data fetched from ROM 14 (or memory 11) using the address from Acc during Q4/S1 to Q1/S2 is loaded onto P-Bus during Q2 of S2 where it remains until Q4 of S2 at which time the BIM accepts the data from P-Bus and then transfers it to D-Bus on Q2 of S3, the next state. The destination address for RAM 15 is loaded into decoder 15b from P-Bus by Q3 of S1 and remains for two states, so the RAM write occurring at Q2 of S3 will use the RAM address defined in the original TBLR opcode.

ANALOG INTERFACE

The analog interface circuits are implemented with two integrated circuits 12a and 12b. One chip 12a provides the analog input channel, and the other 12b provides the output channel. Both connect directly to the bidirectional data bus D of processor 10 for data transfer and control, and also to the address bus RA and control bus 13 for control.

The analog input channel 12a seen in FIG. 4 consists of an antialiasing lowpass filter 30, a highpass filter 31 for low frequency noise rejection, an analog-to-digital converter (ADC) 32 and a first-in-first-out (FIFO) buffer memory 33. Under control of processor 10 each filter may be switched in or out of the signal path by switches 34 and 35 and analog port one or two selected by a switch 36. Both the ADC 32 conversion rate and the lowpass filter passband are independently controllable from the processor 10. The ADC output 37 is stored in the FIFO buffer that is emptied under processor 10 control to the bus 38 which goes to data bus D. In addition the analog input channel 12a contains logic circuit 40 to control these circuits 30, 31, 32 and 33 and interface to the data bus D. There is also a digital serial input port 41 that may be used to interface the processor 10 to serial data.

Figure 5:
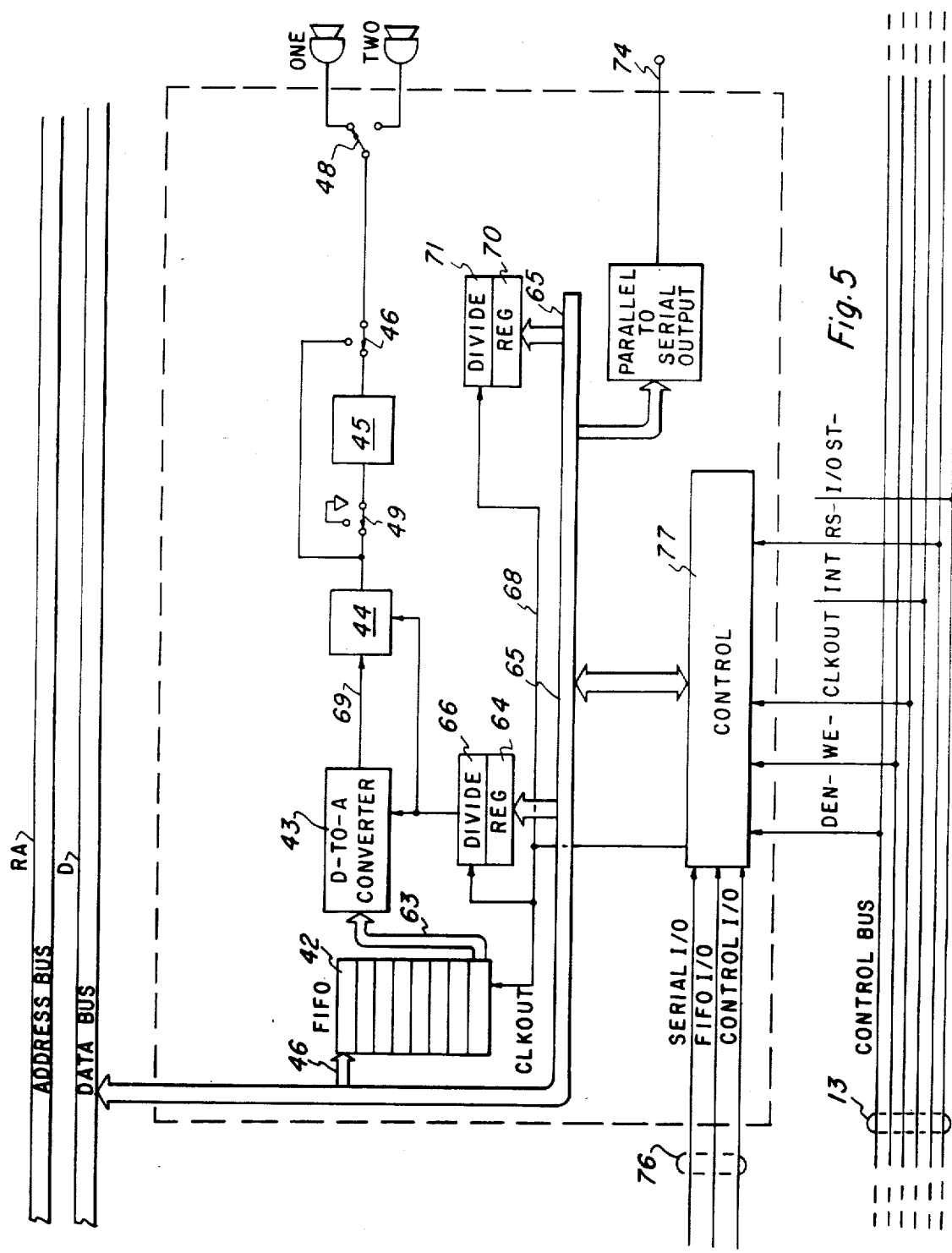
FIG. 5 is an electrical diagram in block form of the analog output channel 12b of the system of FIG. 1.

The analog output channel 12b as seen in FIG. 5 consists of a FIFO memory 42, a digital-to-analog converter (DAC) 43, a sin (x)/(x) correction filter 44 and an interpolating lowpass filter 45. The FIFO memory 42 is loaded by lines 46 from data bus D under control of the program executed in the processor 10, and unloaded by lines 47 at the DAC 43 conversion rate. Like the analog input channel, the processor 10 can control the converter 43 rate and the lowpass filter passband, the filter 45 may be switched out of the signal path by the switch 46, and the analog ports one or two may be selected for output by switch 48.

ANALOG INPUT CHANNEL

The main elements of the analog input channel are the antialiasing filter 30, highpass filter 31, ADC 32 and FIFO memory 33. Each of these will be discussed in detail below.

Antialiasing Filter

The antialiasing filter 30 is composed of three lowpass filters in series. A switched-capacitor, discrete-time filter is preceeded and followed by active RC filters. The purpose of the first RC filter is to provide the antialiasing function for the switched-capacitor filter. The second RC filter removes signal aliases from the output signal of the switched-capacitor filter so that it may be sampled asynchronously by the ADC 32.

The precision filter specifications (passband ripple, corner frequency, stopband rejection, etc.) are provided by the switched-capacitor filter. This discrete-time filter is operated by an internal clock that is programmable by the processor 10. The filter is designed such that the corner frequency (−3 dB attenuation) is 2.11% of its clock frequency. It is a fifth order elliptic lowpass filter with −50 dB stopband rejection.

The programmable clock is derived from the chip 10 master clock CLKOUT. Under processor 10 control, a 6-bit register 50 is loaded with an integer. The divider 51 divides the master clock frequency CLKOUT from line 52 by this integer to obtain the filter 30 clock frequency on input 52. This scheme provides $2**6-1$, or sixty-three possible filter clock frequency codes, corresponding to sixty-three selectable positions for the filter 30 corner frequency between 1.675 kHz and 105.5 kHz. This discrete-time filter, however, is not functional over the entire range. When the corner frequency is set above 8 kHz the internal operational amplifiers in filter 30 have insufficient time to settle. And while the switched-capacitor filter 30 will function down to the lower corner frequency limit, there may be aliasing problems caused by insufficient, antialiasing by the first active RC filter. The composite antialiasing filter 30 will provide −50 dB stopband rejection when the corner frequency is between 3.3 and 8.1 kHz.

The master clock must be in the range 1-5 MHz, and should be synchronous with the processor 10. This is done by using the processor 10 output clock CLKOUT as the analog input channel input clock 52. When using a 1 MHz master clock, the only allowed values of the frequency devider are 3, 4, 5 and 6 corresponding to corner frequencies at 7.03 kHz, 5.00 kHz, 4.00 kHz and 3.33 kHz, respectively. When using a 2 MHz master clock, the allowed values of the divider are 6-to-12, covering the corner frequency range between 3.33 kHz and 7.03 kHz in seven steps. Thus, the higher the master clock frequency, the greater the precision of the position of the corner frequency. The maximum allowable frequency of the master clock is 5 MHz (provided when the processor 10 is operating at maximum speed.) With this master clock frequency the allowable values for the frequency divider 51 are between 13-and-32, covering the corner frequency range between 3.3 kHz and 8.11 kHz in twenty steps.

Because the switched-capacitor filter is a discrete-time system, it causes its own aliasing problems. The input aliasing problems are prevented with the first continuous-time, fourth order Butterworth RC filter 53 preceeding the switched-capacitor filter. It is an active filter implemented in conventional manner with operational amplifiers, polisilicon resistors and capacitors. Its characteristics are much less precise than those of the filter 30. It is a fourth order Butterworth lowpass with the corner frequency fixed at 30 kHz so that variations in polysilicon resistivity and oxide thickness will not affect the overall performance of the composite antialiasing filter. It provides less than −0.125 dB passband droop in the audio band below 8.1 kHz and greater than −50 dB stopband rejection at and above the nominal minimum discrete-time filter clock frequency, 156 kHz. This stopband rejection is adequate only if the system noise at 156 kHz is −46 dB below the maximum input signal.

The switched-capacitor filter 30 also has output aliasing problems. Its output has a 'stairstep' waveform similar to the output of a sample-and-hold circuit. The frequency spectrum of this wave form is the lowpass filter transfer function repeated at every harmonic of the filter sampling clock frequency. Thus, the output of the discrete-time filter is not truly bandlimited, but has components at harmonics of the filter clock frequency. Aliasing will occur when this signal is sampled by the ADC 32. If the ADC conversion rate is an integer subharmonic of the filter clock frequency, the aliasing folds the spectrum back into the baseband, exactly compensating for the effect of the filter stairstep output. However, if the ADC 32 samples asynchronously with respect to the filter clock, spectral distortion will occur.

Since the analog input channel 12a allows the filter passband and the ADC 32 conversion rate to be programmed independently, causing the switched capacitor filter 30 and ADC 32 to operate asynchronously, a continuous-time lowpass filter 54 must be placed between the discrete-time filter and the ADC 32 to remove the high frequency components produced by the 'stairstep' output waveform. In principle the stopband rejection of this filter 54 need not be as high as the first continuous-time filter 53, but practical implementation problems, such as filter clock 52 feed through, dictate a minimum of −50 dB stopband rejection at the filter clock frequency. In order to provide a conservative design margin, the second continous-time filter 54 is identical to the first.

In summary, the antialiasing filter is composed of three lowpass filters in series. The first, driven directly by the analog input signal is a continous-time RC filter 53 performing the antialiasing function for the second, a discrete-time, switched-capacitor filter 30. This second filter 30 provides the programmable bandwidth. The third filter is a continous-time RC structure identical to the first filter and prevents aliasing when the discrete-time filter is sampled asynchronously.

The composite antialiasing filter provides −50 dB stopband rejection in the frequency band between the programmable corner frequency and 30 kHz. Above 30 kHz the rejection increases at 24 db/octave. This response is tailored for speech-like input signals, i.e., signals with spectral energy roughly inversely proportional to frequency.

The −50 dB stopband rejection attenuates the inherently lower energy components to a level normally −96 dB below the passband component energy.

Under processor 10 control, the antialiasing filter may be bypassed by switch 34, switched to analog port one or two by switch 36, or grounded by switch 55 (for test purposes).

Highpass Filter

The highpass filter 31 is a switched-capacitor implementation of a highpass transformation of a linear phase lowpass prototype. It is a third order filter with nominal corner frequency and transmission zero of 218 Hz and 60 Hz, respectively. It is implemented as a switched-capacitor filter in order to conserve silicon area as well as provide chip-to-chip reproducibility. The sample clock of the highpass must be synchronous with either the lowpass switched-capacitor filter 30 or the ADC 32 in order to avoid yet another active RC filter. The ADC is the preferable of the two since this lower sample rate allows the highpass to be built in less silicon area.

Since the filter 31 is operated at the ADC 32 sampling rate the corner frequency is dependent upon the ADC operation. In order to maintain the highpass corner frequency near its nominal value of 218 Hz, the capacitor ratios within the highpass filter change as a function of the programmed ADC conversion rate due to divided clock input 56. However, the capacitor ratios do not track exactly. This results in a +/−16% variation of the highpass corner frequency as a function of the ADC rate. With this variation a minimum rejection of −25 dB is guaranteed at 60 Hz, and a maximum of −2 dB passband droop is caused at 300 Hz.

Analog-to-Digital Converter

The ADC 32 is a device of conventional construction, providing a linear 2's complement representation of the analog signal. It consists of an 8-bit capacitor multiplying DAC driven by the output of an 8-bit resistor DAC. It operates internally as a sign/magnitude converter. Conversion to 2's complement representation is performed in the output register.

The ADC 32 requires two reference levels for its internal DAC. These are derived from the voltage supplies by a resistor divider, and they are available on external pins for decoupling. The absolute accuracy of the reference voltages is better than 1% assuming zero power supply error. An error of 5% on the analog supplies will cause a 0.5 dB gain error in the ADC. In applications where the overall gain is critical, the reference pins may be biased by the user.

ADC conversions occur in either of two modes of operation, selectable by processor 10 command. When the 'free-running' mode is selected, the ADC 32 converts continuously at the rate programmed by the processor. Fine control of the ADC rate is possible in the 'free-running' mode by processing instruction. The processor may issue a command to increment or decrement the ADC period by a single count for a single conversion period and revert back to the original period for subsequent conversion cycles. This allows the processor 10 to phase-correct the ADC cycle. In the 'triggered' mode the converter waits until a convert signal is received on either an external pin or by processor 10 instruction.

In the free-running mode the convert signal is generated by a frequency divider 57. The master clock CLKOUT is divided in divider 57 by a ten bit integer loaded into register 58 by the processor 10. This provides 1023 possible ADC periods. However, the ADC is not functional over the entire range of converter clock rates. The maximum ADC conversion rate is 16 kHz. This means that the functional range of frequency divisions is 312 to 1023 when a 5 MHz master clock is used. At the low frequency end of the ADC rate range, the the lowest operational antialiasing filter 30 corner frequency is 3.3 kHz. When the ADC rate is below 6.6 kHz, the antialiasing filter may not provide its maximum stopband rejection above the ADC Nyquist frequency. The chip performance is dependent upon the shape of the noise spectrum. The nominal range of integers used in register 58 to control the ADC converter signal is 312 to 760.

Even when the ADC 32 conversion rate is between 6.6 kHz and 16 kHz, a match of the ADC Nyquist frequency and the filter 30 corner frequency is not generally possible. To see this, consider an analog input channel with a 5 MHz master clock. The ADC frequency divisions, yielding conversion rates between 6.6 kHz and 16 kHz are between 758 and 312. As mentioned above regarding the antialiasing filter, the allowed filter clock frequency divisions range between 13 and 32. Thus, there are twenty positions of filter corner frequency and 447 distinct ADC Nyquist frequencies, only 20 of which may be matched precisely. For an arbitrary ADC conversion rate there will typically be a small mismatch of the filter corner frequency and the ADC Nyquist frequency. When using a 5 MHz master clock CLKOUT, the mismatch need never be greater than 2.9%.

Thus far, the ADC 32 is described mostly in terms of the free-running mode of operation. In the 'triggered' mode an ADC conversion will occur only when an external convert command is received on line 59. The convert signal may be supplied by external pin, or by processor 10 instruction. If convert signals are received before an on-going conversion is complete, they will be ignored.

The triggered mode of operation is not totally independent of the programmed ADC conversion rate. There is an internal ADC clock derived from the ADC conversion rate divider 57. This clock is used to execute the successive approximation algorithm. When operating in the triggered mode the user must program an ADC conversion rate for loading into the register 58 at least as high as the planned triggered rate. This will insure that ADC conversions will be complete when subsequent convert signals are received. Otherwise it would be possible to generate trigger signals below 16 kHz and yet too fast for the ADC.

First-In-First-Out Memory

A sixteen word by 16-bit FIFO 33 is used to store the ADC output from line 37. This memory is implemented with a clocked "bubble-through" architecture. The bubble-through time is sixteen master clock cycles. When the FIFO 33 is full, further input from 37 is inhibited, so unless the FIFO is serviced prior to the next ADC conversion, data will be lost.

Two status bits indicating FIFO empty, FE-, and FIFO full, FF- are provided on external tri-state pins 60 and 61. These signals may be masked by programmed control. When masked, the levels on pins 60 and 61 are high impedance. Typical systems use these signals as system interrupts. The masking feature allows the interrupt feature to be switched OFF on selected devices.

ANALOG OUTPUT CHANNEL

The analog output channel 12b is architecturally very similar to the analog input channel 12a. The major elements of the analog output channel are the FIFO 42, the D-to-A converter 43, and filters 44 and 45. Each of these elements are generally of known construction when considered alone, and will be described briefly below.

FIFO Memory

The FIFO buffer 42 is identical to the input FIFO 33. Input from the data bus D by lines 46 occurs under system control, while output on lines 47 is performed synchronously with the DAC 43 at the specified conversion rate. When the FIFO 42 becomes empty, the DAC operation continues, converting continuously the last value contained in the FIFO.

Digital-To-Analog Converter

The DAC 43 is a 16-bit linear sign/magnitude converter. It is identical to the DAC internal to the ADC 32. The conversion occurs in either the 'free-running' or 'triggered' modes, and conversion rate range is also the same as the ADC 32.

To set the conversion rate, a register 64 is loaded from the internal data bus 65 under processor 10 control, and the number in this register determines the number of the divide circuit 66 which divides down the master clock CLKOUT from line 68.

There are two timing features available to the DAC 43 that do not exist on the ADC 32. In the 'free-running' mode, fine control of the DAC conversion period is achieved with a reference clock input pin 68. A phase comparator is included on the analog output channel 12b that is used to compare the phases of the DAC conversion cycle and the reference input 68. If the reference input makes a transition high before the DAC begins conversion, the period of the DAC 43 is decremented for one DAC cycle. If the reference signal mades its transition high after the beginning of a conversion cycle, the period of the DAC is incremented for a single cycle.

The second timing feature is the 'software jam' of the DAC cycle. When the processor 10 places the analog output channel 12b in the 'jammed' mode all subsequent DAC conversion cycles are inhibited until the rising edge of the reference clock is detected. Normal DAC operation follows.

SIN(X)/X Correction Circuit

The output 69 of the DAC, because it has a stairstep waveform, possesses a 3.9 DB droop at the Nyquist Frequency.

To compensate for this droop, a switched-capacitor circuit 44 is included between the DAC and the filter to provide peaking required to flatten the spectrum of the DAC. This switched-capacitor filter operates synchronously with the DAC 43, thus allowing the complete independence of the DAC conversion rate and the interpolating filter corner frequency.

Smoothing Filter

The smoothing filter 45 is identical to the antialiasing filter found on the analog input channel 12a. The corner frequency is set by loading register 70 under processor control, and this determines the operation of divider 71 which devides down the clock from line 68, producing an input 72 to the filter 45.

Control

Control of the analog circuits 12a and 12b is maintained with a total of ten control signals. Of these, five signals are used for address control and are common to both the analog input channel 12a and the analog output channel 12b. There are three pins coupled to the three port address lines RAp in the address RA; these are used to address the three different functions on each chip. Data to or from the serial I/O port are transferred when 'SERIAL I/O-' is low. Likewise data to or from the FIFOs is transferred when the 'FIFO I/O-' is active low. When 'CONTROL I/O-' is low the data transferred are used to control the configuration of the chips by loading registers 50, 58, 64, 70, etc.; it is this address that is used to allow the processor 10 to issue commands to the analog peripheral circuits. The strobes, 'DEN-' and 'WE-' from control bus 13 are used to strobe the data to and from the processor 10, respectively. The analog input channel 12a and analog output channel 12b responses to these signals are summarized in Table C.

A feature of the analog interface is minimizing the number of peripheral addresses required for control. This is especially important when the processor 10 is the main processor of the system where only eight port addresses are available. The two chips 12a and 12b connect to the same three I/O enable signals. When 'SERIAL I/O' is active the serial input port 41 on the analog input channel 12a is accessed on the arrival of 'DEN-', and the serial output port 74 on the analog output channel 12b responds to 'WE-'. Similarly, the analog input channel 12a FIFO 33 is read on 'DEN-' and the analog output channel 12b FIFO 42 loaded on 'WE-' when 'FIFO I/O-' is active. Likewise the 'CONTROL I/O-' is also shared by both analog input channel 12a and analog output channel 12b. The desired port addresses are selected with a 3-to-8 line decoder 75, allowing any of the eight possible port addresses RAp to be assigned to any of these three functions.

These three controls 76 are applied to control circuitry 40 or 77 within the chips 12a or 12b, along with the DEN- and WE- commands from control bus 13 and the master clock CLKOUT. In addition, the 16-bit data bus D is coupled to the controls 40 or 77 by internal busses 38 or 65, so that control words may be suppled to the chips 12a and 12b.

The 'CONTROL I/O-' signal is shared by the two chips 12a, 12b yet the operation of issuing or reading control data is somewhat more complex than reading or writing FIFO or serial data. In order to program the states of both the analog input channel 12a and analog output channel 12b using a single processor 10 port address, additional addressing information must be coded in the data word. The coding scheme is summarized in Table D. The four MSB's of the data word are decoded by the control circuitry 40 or 77 in analog input channel 12a and analog output channel 12b. The nine codes of Table D are used to program the filter bandwidths and converter rates, control the status of each chip and program the analog input channel 12a reference (to be explained below).

Two control words are used to affect the status of each of the chips. Tables E and F summarize the analog input channel 12a intrepretation to control words one and two, respectively. Control word one is used to initiate ADC conversions in the 'triggered' mode, select the mode, mask FIFO status pins, clear the FIFO, increment or decrement the ADC period by a master clock period for one ADC cycle, and select the analog input pins. Control word two is used to select the filter configuration, select the origin of the 'REFERENCE OUT' signal in the 'free-running' mode, and select the word length of the serial data input. Tables G and H list the analog output channel 12b interpretation of the two control words.

The status of the two chips is read by the processor 10 when the 'DEN-' strobe is issued while 'CONTROL I/O' is low.

The serial data input port 41 on analog input channel 12a and the serial output data port 74 on analog output channel 12b each employ three pins. They are 'DI', 'CI' and 'SYNCI' on analog input channel 12a and 'DO', 'CO' and 'SYNCO' on analog output channel 12b.

The remaining control pin is the reset RS signal. This is an active low signal. Typically an RC time constant holds this pin low for several milliseconds at power up. This time constant is larger than the time constant of the ADC and DAC voltage reference pins in order to insure that the reference levels have been stablized before offset correction is initiated. Reset may also occur under program control.

The effect of reset RS- depends upon the mode of operation. In the free-running mode, the FIFO is cleared, the ADC or DAC conversion rate is set to 8 kHz, and the corresponding filter bandwidth is set to 4 kHz. In the triggered mode, the FIFO is cleared, the filter bandwidth is preset to 6.25 kHz and the ADC or DAC await the trigger signal. In the triggered mode the internal clock of the converter is set to its maximum frequency to allow any conversion rate up to 12.5 kHz. In either mode the FIFO status pins are unmasked.

Both the analog input channel 12a and the analog output channel 12b have a 'CVT/REFERENCE' pin. This pin provides the hook to synchronize the analog signal with the processor 10 program execution.

On the analog input channel 12a the full name of the pin is 'CVT/REFERENCE OUT'. It is a bidirectional pin with different functionality in the 'free-running' and 'triggered' modes of analog input channel 12a operation. In the 'free-running' mode the pin becomes 'REFERENCE OUT', and the signal is a clock synchronous with the ADC rate. This clock output is either the ADC convert signal or a clock generated by a separated programmable frequency divider. It is the responsibility of the user to program this separate frequency divider so that the clock is synchronus with the ADC. In the 'triggered' mode this analog input channel 12a pin becomes 'CVT', and is the external ADC convert command.

On the analog output channel 12b the full name of the pin is 'CVT/REFERENCE IN'. It's function changes with analog output channel 12b operation mode, but is is always an input pin. In the 'triggered' mode it is the convert command for the DAC.

In operation, the processor 10 is programmed to execute a series of OUTPUT instructions which are selected by the person writing the code to set up the input and output interface chip according to Tables C to H. For example, to establish both input and output chips with free-running A-to-D or D-to-A converters, the code used is 000 0100 00X1 XXXX 0000 (reading bit-15 through bit 0) for the data word, while the RAp port address and WE-, DEN- produce the code 1101 of Table C. The processor 10 can periodically check the status of the FIFO 33 to see if it should be unloaded, using the code of the Tables, but more likely the condition of the FIFO is used to drive the interrupt control like INT-, or used to cause a branch in the CPU by the I/O ST- control line.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

TABLE A

| | | | | THE INSTRUCTION SET |
|---|---|---|---|---|
| Source Code | Object Code-Binary | No. of Cycles | No. of Words | Description |
| ADD | 0000SSSSIAAAAAAA | 1 | 1 | Add word at RAM address A (shifted S places to left) to Acc; Result to Acc |
| SUB | 0001SSSSIAAAAAAA | 1 | 1 | Subtract word at address A (shifted S places to left) from ACC; Result to Acc |

TABLE A-continued

THE INSTRUCTION SET

| Source Code | Object Code-Binary | No. of Cycles | No. of Words | Description |
|---|---|---|---|---|
| LAC | 0010SSSSIAAAAAAA | 1 | 1 | Load Acc with word at address A (shifted S places to left) |
| SAR | 00110RRRIAAAAAAA | 1 | 1 | Store contents of Aux Reg number R at location defined by A |
| LAR | 00111RRRIAAAAAAA | 1 | 1 | Load Aux Reg R with value at location A |
| IN | 01000PPPIAAAAAAA | 2 | 1 | Input value on external data bus, store in A |
| OUT | 01001PPPIAAAAAAA | 2 | 1 | Output value at address A to ext data bus |
| SACL | 01010XXXIAAAAAAA | 1 | 1 | Store low order Acc bits in location A, shifted X places left |
| SACH | 01011XXXIAAAAAAA | 1 | 1 | Store high order Acc bits in location A, shifted X places left |
| ADDH | 01100000IAAAAAAA | 1 | 1 | Add value at address A to high order Acc bits; result to Acc; no shift |
| ADDS | 01100001IAAAAAAA | 1 | 1 | Add Acc to value at address A sign extension suppressed |
| SUBH | 01100010IAAAAAAA | 1 | 1 | Subtract value at address A from high order Acc bits; result to Acc; no shift |
| SUBS | 011000AA1AAAAAAA | 1 | 1 | Subtract with sign extension suppressed |
| SUBC | 01100100IAAAAAAA | 2 | 1 | Conditional subtract for divide; left shift ALU output and conditional +1 |
| ZALH | 01100101IAAAAAAA | 1 | 1 | Zero Accumulator and Load High order half of Acc with addressed data |
| ZALS | 01100110IAAAAAAA | 1 | 1 | Zero Accumulator and Load with sign Extension Suppressed |
| TBLR | 01100111IAAAAAAA | 3 | 1 | Table Read; read data from program memory using Acc or address; store in RAM |
| MAR | 01101000IAAAAAAA | 1 | 1 | Modify Auxiliary Registers |
| DSHT | 01101001IAAAAAAA | 1 | 1 | Data Shift; value defined by A shifted to A+1 |
| LT | 01101010IAAAAAAA | 1 | 1 | Load T Reg with value defined by A |
| LTD | 01101011IAAAAAAA | 1 | 1 | Load T Reg with value A; shift A to A+1; Acc+Preg Acc |
| LTA | 01101100IAAAAAAA | 1 | 1 | Load T Reg with value defined by A; Acc+Preg Acc |
| MPY | 01101101IAAAAAAA | 1 | 1 | Multiply T times value defined by A, result to P Reg |
| LDPK | 01101110DDDDDDDD | 1 | 1 | Load page reg for data memory with 8-bit constant D |
| LDP | 01101111IAAAAAAA | 1 | 1 | Load DP reg with value whose address is at A |
| LARK | 01110RRRDDDDDDDD | 1 | 1 | Load Auxiliary Register R with 8-bit constant D; MSB's Zero |
| EXOR | 01111000IAAAAAAA | 1 | 1 | Exclusive OR Acc with value defined by A; result to LSBs of Acc; zero-MSB's |
| AND | 01111001IAAAAAAA | 1 | 1 | AND LSB's of Ace with value defined by A; result to LSB's of Acc; (zero)-(MSB's) |
| OR | 01111010IAAAAAAA | 1 | 1 | OR LSB's of Acc with value defined by A; result to Acc; (zero)+(MSB's of Acc) |
| LST | 01111011IAAAAAAA | 1 | 1 | Load Status with 16-bit value found at location A in RAM |
| SST | 01111100IAAAAAAA | 1 | 1 | Store Status in location defined by 8-bit address A in RAM |
| TBLW | 01111101IAAAAAAA | 3 | 1 | Table Write; write the value at RAM address to program memory address in Acc |
| LACK | 01111110DDDDDDDD | 1 | 1 | Load Accumulator with 8-bit constant from instruction word |
| NOOP | 0111111110000000 | 1 | 1 | No-operation |
| DINT | 0111111110000001 | 1 | 1 | Disenable Interrupt-masks interrupt input INT |
| EINT | 0111111110000010 | 1 | 1 | Enable Interrupt-unmasks interrupt input INT |
| ABS | 0111111110001000 | 1 | 1 | Absolute Value operation; if Acc 0, Acc Acc; else Acc Acc |
| ZAC | 0111111110001001 | 1 | 1 | Clear Accumulator; zeros Acc |
| RAMV | 0111111110001010 | 1 | 1 | Reset Overflow Mode |
| SAMV | 0111111110001011 | 1 | 1 | Set Overflow Mode |
| CALLA | 0111111110001100 | 2 | 1 | Call subroutine indirect |
| RET | 0111111110001101 | 2 | 1 | Return from Subroutine |
| PAC | 0111111110001110 | 1 | 1 | Load accumulator with contents of P Reg |
| APAC | 0111111110001111 | 1 | 1 | Add accumulator to contents of P Reg; Result to Acc |
| SPAC | 0111111110010000 | 1 | 1 | Subtract contents of P Reg from Accumulator; Result to Acc |
| MPYK | 100CCCCCCCCCCCCC | 1 | 1 | Multiply by constant C |
| BARNZ | 11110100XXXXXXXX | 2 | 2 | Branch if Loop Counter Not Zero, to location defined PC+1 |
| BV | 11110101XXXXXXXX | 2 | 2 | Branch if Overflfow Bit in ST is 1 |
| BIOZ | 11110110XXXXXXXX | 2 | 2 | Branch if IO in ST (from IO pin) is 1 |
| CALL | 11111000XXXXXXXX | 2 | 2 | Call Subroutine |
| B | 11111001XXXXXXXX | 2 | 2 | Unconditional Branch to location W at PC+1 |
| BLZ | 11111010XXXXXXXX | 2 | 2 | Branch if Acc is less than zero |
| BLEZ | 11111011XXXXXXXX | 2 | 2 | Branch if Acc is less than or equal to zero |
| BGZ | 11111100XXXXXXXX | 2 | 2 | Branch if Acc is greater than zero |
| BGEZ | 11111101XXXXXXXX | 2 | 2 | Branch if Acc is greater than or equal to zero |
| BNZ | 11111110XXXXXXXX | 2 | 2 | Branch if Acc is not zero |
| BZ | 11111111XXXXXXXX | 2 | 2 | Branch if Acc is equal to zero |

TABLE B

ALU FUNCTIONS

| | Control Code | | | | | | Propogate | Generate | |
|---|---|---|---|---|---|---|---|---|---|
| | #AUM0 | #AUM1 | #AUM2 | #AUM3 | #AUM4 | #AUMB | Node | Node | Output |
| Add | 0 | 1 | 1 | 0 | 0 | 0 | A + B | AB | $A + B + C_{in}$ |
| Subtract | 1 | 0 | 0 | 1 | 0 | 0 | A + B | AB | $A + B + C_{in}$ |
| Load Acc | 0 | 1 | 0 | 1 | 1 | 0 | B | X | B + 1 = B |
| Exclusive Or | 1 | 0 | 0 | 1 | 1 | 0 | A + B | X | A + B + 1 = A + B |
| Or | 1 | 0 | 0 | 1 | 1 | 0 | AB (= A + B) | X | A + B + 1 = A + B |
| And | 0 | 1 | 1 | 1 | 1 | 0 | A + AB | X | (A + AB) + 1 = A + B = A |
| Abs. Value | 0 | 0 | 1 | 1 | 0 | 1 | A | 0 | $A + C_{in}$ |

TABLE C

Addressing Control For Analog Input and Output Channels

| SERIAL I/O | FIFO I/O | CONTROL I/O | WE- | DEN- | OPERATION IN ANALOG INTERFACE CHANNELS 12a and 12b |
|---|---|---|---|---|---|
| 1 | 1 | 0 | 1 | 0 | Processor 10 reads status word from chips 12a or 12b |
| 1 | 1 | 0 | 0 | 1 | Control Word written into chips 12a or 12b |
| 1 | 0 | 1 | 1 | 0 | FIFO in Analog Input Chip 12a is accessed |
| 1 | 0 | 1 | 0 | 1 | FIFO in Analog Output Chip 12b is accessed |
| 0 | 1 | 1 | 1 | 0 | Store Serial input 41 data in Analog Input Chip 12a |
| 0 | 1 | 1 | 0 | 1 | Load shift reg in Output Chip 12b for serial output 74 |
| 1 | 1 | 1 | X | X | Chip 12a and 12b disabled |

TABLE D

Control Addressing for the Analog Input and Output Chips

| Data Bits on Data Bus D | | | | Operation in Analog Interface channels 12a and 12b using Data Bits D4–D15 from Data Bus D |
|---|---|---|---|---|
| MSB D0 | D1 | D2 | D3 | |
| 0 | 0 | 0 | 0 | Load register 58 on analog input chip 12a to program the A-to-D conversion period (sampling rate), using bits D6–D15 on data bus D |
| 0 | 0 | 0 | 1 | Load register 50 on chip 12a with data bits D10–D15 to program the filter sample period. |
| 0 | 0 | 1 | 0 | Load register 64 on chip 12b with data bits D6–D15 to program the D-to-A conversion period |
| 0 | 0 | 1 | 1 | Load register 70 on chip 12b with data bits D10–D15 to program the interpolation filter 45 sample period. |
| 0 | 1 | 0 | 0 | Data bits D4–D15 are the control word one for the input chip 12a; loaded into control 40 and decoded. |
| 0 | 1 | 0 | 1 | Data bits D4–D15 are the control word two for the input chip 12a; loaded into control 40 and decoded. |
| 0 | 1 | 1 | 0 | Data bits D4–D15 are the control word one for the analog output chip 12a; loaded into control 77 and decoded |
| 0 | 1 | 1 | 1 | Data bits D4–D15 are the control word two for the analog output chip 12a; loaded into control 77 and decoded |
| 1 | 0 | 0 | 0 | Data bits D12–D15 used to program the reference period for the input chip 12a in control 40 |

TABLE E

Analog Input Chip Control Word One

| Data Bit in Control Word One | State | Operation in Analog Input Chip 12a |
|---|---|---|
| D15 | 1 | Trigger A-to-D Converter 32 from Processor 10 when in Trigger Mode |
| D14 | 1 | A-to-D Converter 32 placed in Free Run Mode |
| D14 | 0 | A-to-D Converter 32 placed in Trigger Mode |
| D13 | 1 | Software Reset |
| D12 | 1 | Mask FIFO Status |
| D12 | 0 | Unmask FIFO Status |
| D11 | 1 | Clear FIFO (reset to all zeros) |
| D10 | 1 | Enable the increment/decrement for filter 30 for phase control |
| D10 | 0 | Disable the increment/decrement |
| D9 | 1 | Increment |
| D9 | 0 | Decrement |
| D8 | 1 | Set switch 36 on One |
| D8 | 0 | Set switch 36 on Two |
| D7–D4 | — | Not Used |

TABLE F

Analog Input Chip Control Word Two

| Data Bit in Control Word Two | State | Operation in Chip 12a |
|---|---|---|
| D15 | 1 | Bypass Highpass Filter 31 by switch 35 |
| D15 | 0 | Move switch 35 so Highpass Filter 31 is not bypassed |
| D14 | 1 | Move switch 34 to bypass lowpass filter 30 |
| D14 | 0 | Move switch 34 so Lowpass Filter 30 is not bypassed |
| D13 | 1 | Shunt both filters 30 and 31 to grounded input by switches 55 |
| D12 | 1 | Conversion Rate Out |
| D12 | 0 | Reference Rate Out |
| D11 | 1 | UART I/O 16-bits |
| D11 | 0 | UART I/O 8-bits |
| D10–D4 | — | Not Used |

TABLE G

Analog Output Chip Control Word One

| Data Bit in Control Word One | State | Operation in Analog Output Chip 12b |
|---|---|---|
| D15 | 1 | Trigger D-to-A Converter 43 from Processor 10 when in Trigger Mode |
| D14 | 1 | D-to-A Converter 43 placed in Free Run Mode |
| D14 | 0 | D-to-A Converter 43 placed in Trigger Mode |
| D13 | 1 | Software Reset |
| D12 | 1 | Mask FIFO Status |
| D12 | 0 | Unmask FIFO Status |
| D11 | 1 | Clear FIFO (reset to all zeros) |
| D10 | 1 | Set switch 48 on One |
| D10 | 0 | Set switch 48 on Two |
| D9 | — | Not used |
| D8 | — | Not used |
| D7 | 1 | Jam Enabled |
| D7 | 0 | Jam Disabled |
| D6–D4 | — | Not used |

TABLE H

| Analog Output Chip Control Word Two | | |
|---|---|---|
| Data Bit in Control Word Two | State | Operation in Chip 12b |
| D15 | 1 | Bypass Highpass Filter 45 by switch 46 |
| D15 | 0 | Move switch 46 so Highpass Filter 45 is not bypassed |
| D14 | — | Not used |
| D13 | 1 | Shuntfilters 45 to grounded input by switches 49 |
| D12 | — | Not used |
| D11 | 1 | Switch 40 in position One |
| D11 | 0 | Switch 48 in position Two |
| D10–D4 | — | Not Used |

What is claimed is:

1. A microcomputer system with programmable interface circuits comprising:

(a) processing means having a CPU, a memory, control bus means, and data bus means, (b) an input interface circuit for said system coupled to said control bus means and to said data bus means; said input interface circuit including:

a data input, first translating means having an input connected to said data input and having an output, said first translating means performing a selectable translation of the form of data from said data input to produce translated data at said output, first memory means connected to receive said translated data from said output of said first translating means, said first memory means having an output coupled to said data bus means, and first control means receiving commands from said control bus means and receiving coded controls from said data bus means, said first control means selecting said translation of form used in said first translating means, (c) an output interface circuit for said system coupled to said control bus means and to said data bus means, said output interface circuit including:

second memory means, said second memory means having an input connected to said data bus means and an output coupled to second translating means, said second translating means performing a selectable translation of the form of data from said output of the second memory means to produce translated data at an output, a data output coupled to said output of said second translating means, and second control means receiving commands from said control bus means and receiving coded controls from said data bus means, said second control means selecting said translation of form used in said second translating means.

2. A system according to claim 1 wherein said first translating means includes an analog-to-digital converter of digitally-selectable sample rate.

3. A system according to claim 1 wherein said second translating means includes a digital-to-analog converter of digitally-selectable sample rate.

4. A system according to claim 1 wherein each of said processor means, said input interface circuit and said output interface circuit is a separate semiconductor integrated circuit.

5. A system according to claim 1 wherein said data input is an analog signal and said data output is an analog signal.

6. A microcomputer system comprising:

(a) processor means having a CPU, a memory, control bus means, and data bus means;

(b) an analog input channel having an analog signal input, a filter of digitally-selectable frequency response, an analog-to-digital converter of selectable sample rate, a first-in first-out memory, a digital data output, and input channel control means, said filter having an input connected to said analog signal input and an output connected to an input of the analog-to-digital converter, said first-in first-out memory having an input connected to an output of the analog-to-dital converter and having an output connected to said data bus means to thereby supply digital data to said processor means, said input channel control means having inputs connected to said control bus means and said data bus means to supply controls to said filter, to said analog-to-digital converter, and to said first-in first-out memory;

(c) an analog output channel having a digital data input, a first-in first-out memory, a digital-to-analog converter of selectable sampling rate, a filter of digitally-selectable frequency response, a signal output, and output channel control means, said digital data input being coupled to said data bus means and having an output connected to an input of said first-in first-out memory, said digital-to-analog converter having an input connected to said first-in first-out memory and having an output connected to an input of said filter, an output of said filter being connected to said output signal output, said output channel control means having inputs connected to said control bus means and said data bus means to supply controls to said first-in first-out memory, to said analog-to-digital converter, and to said filter.

7. A system according to claim 6 wherein each of said processor means, said analog input channel and said analog output channel is a separate semiconductor integrated circuit.

* * * * *